United States Patent
Tsai et al.

(10) Patent No.: US 8,358,475 B2
(45) Date of Patent: Jan. 22, 2013

(54) PHOTOGRAPHING OPTICAL LENS ASSEMBLY

(75) Inventors: Tsung-Han Tsai, Taichung (TW); Ming-Ta Chou, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 70 days.

(21) Appl. No.: 13/177,565

(22) Filed: Jul. 7, 2011

(65) Prior Publication Data
US 2012/0224273 A1 Sep. 6, 2012

(30) Foreign Application Priority Data
Mar. 4, 2011 (TW) .............................. 100107417 A

(51) Int. Cl.
*G02B 9/34* (2006.01)
*G02B 3/02* (2006.01)

(52) U.S. Cl. ........................................ 359/772; 359/715

(58) Field of Classification Search .......... 359/754–757, 359/759, 763, 764, 767, 771, 772
See application file for complete search history.

(56) References Cited

U.S. PATENT DOCUMENTS

| | | | | |
|---|---|---|---|---|
| 4,279,477 A | * | 7/1981 | Tojo | 359/660 |
| 6,950,246 B2 | * | 9/2005 | Amanai | 359/771 |
| 2003/0112530 A1 | * | 6/2003 | Sato | 359/772 |

\* cited by examiner

*Primary Examiner* — Darryl J Collins
(74) *Attorney, Agent, or Firm* — CKC & Partners Co., Ltd.

(57) ABSTRACT

A photographing optical lens assembly includes, in order from an object side to an image side: the first lens element with positive refractive power having a convex object-side surface, the second lens element with positive refractive power, the third lens element with positive refractive power, and the fourth lens element with positive refractive power. By such arrangement, the total track length of the photographing optical lens assembly would be suitable for compact electronics.

20 Claims, 18 Drawing Sheets

PHOTOGRAPHING OPTICAL LENS ASSEMBLY

RELATED APPLICATIONS

The application claims priority to Taiwan Application Serial Number 100107417, filed Mar. 4, 2011, which is herein incorporated by reference.

BACKGROUND

1. Technical Field

The present invention relates to a photographing optical lens assembly. More particularly, the present invention relates to a compact photographing optical lens assembly applicable to electronic products.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens assembly on a portable electronic product mainly adopts a three-element lens structure, as disclosed in U.S. Pat. No. 7,085,077 wherein a lens system thereof has a first lens element with positive refractive power, a second lens element with negative refractive power and a third lens element with positive refractive power arranged in order from an object-side to an image-side. However, due to the advancement of the manufacturing technology and the demand for compact camera units on various mobile products, the three-element lens structure cannot produce high quality images.

Further, another conventional compact photographing lens assembly provides a four-element lens structure, as disclosed in U.S. Pat. No. 7,365,920. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated, and it is not easy to attach the glass lenses, and thus the is manufacturing process for forming the glass doublet lenses is difficult.

Therefore, a need exists in the art for providing a photographing lens assembly that features better image quality, maintains a moderate total track length, and is easy to manufacture.

SUMMARY

The present invention provides a photographing optical lens assembly includes, in order from an object side to an image side: a first lens element, a second lens element, a third lens element and a fourth lens element. The first lens element with positive refractive power has a convex object-side surface. The second lens element is with positive refractive power. The third lens element is with positive refractive power. The fourth lens element is with positive refractive power. An axial distance from the object-side surface of the first lens element to an image plane is TTL, a maximum image height of the photographing optical lens assembly is Y, and they satisfy the following relationship:

$$TTL/Y<2.1.$$

According to another aspect of the present invention, a photographing optical lens assembly includes, in order from an object side to an image side: a first lens element, a second lens element, a third lens element and a fourth lens element. The first lens element with positive refractive power has a convex object-side surface. The second lens element is with positive refractive power. The third lens element is with positive refractive power. The fourth lens element with positive refractive power has a convex object-side surface and a concave image-side surface, and is made of plastic material, wherein the object-side surface and the image-side surface of the fourth lens element are aspheric, and the fourth lens element has at least one inflection point formed on at least one of the object-side surface and the image-side surface thereof. A focal length of the photographing optical lens assembly is f, a focal length of the second lens element is f2, a focal length of the third lens element is f3, a focal length of the fourth lens element is f4, and they satisfy the following relationship:

$$|f/f2|+|f/f3|+|f/f4|<1.15.$$

According to another aspect of the present invention, a photographing optical lens assembly includes, in order from an object side to an image side: a first lens element, a second lens element, a third lens element and a fourth lens element. The first lens element with positive refractive power has a convex object-side surface. The second lens element with positive refractive power is a meniscus. The third lens element with positive refractive power is a meniscus. The fourth lens element with positive refractive power has a convex object-side surface and a concave image-side surface, and is made of plastic material, wherein the object-side surface and the image-side surface of the fourth lens element are aspheric, and the fourth lens element has at least one inflection point formed on at least one of the object-side surface and the image-side surface thereof.

DETAILED DESCRIPTION

Figure 1:
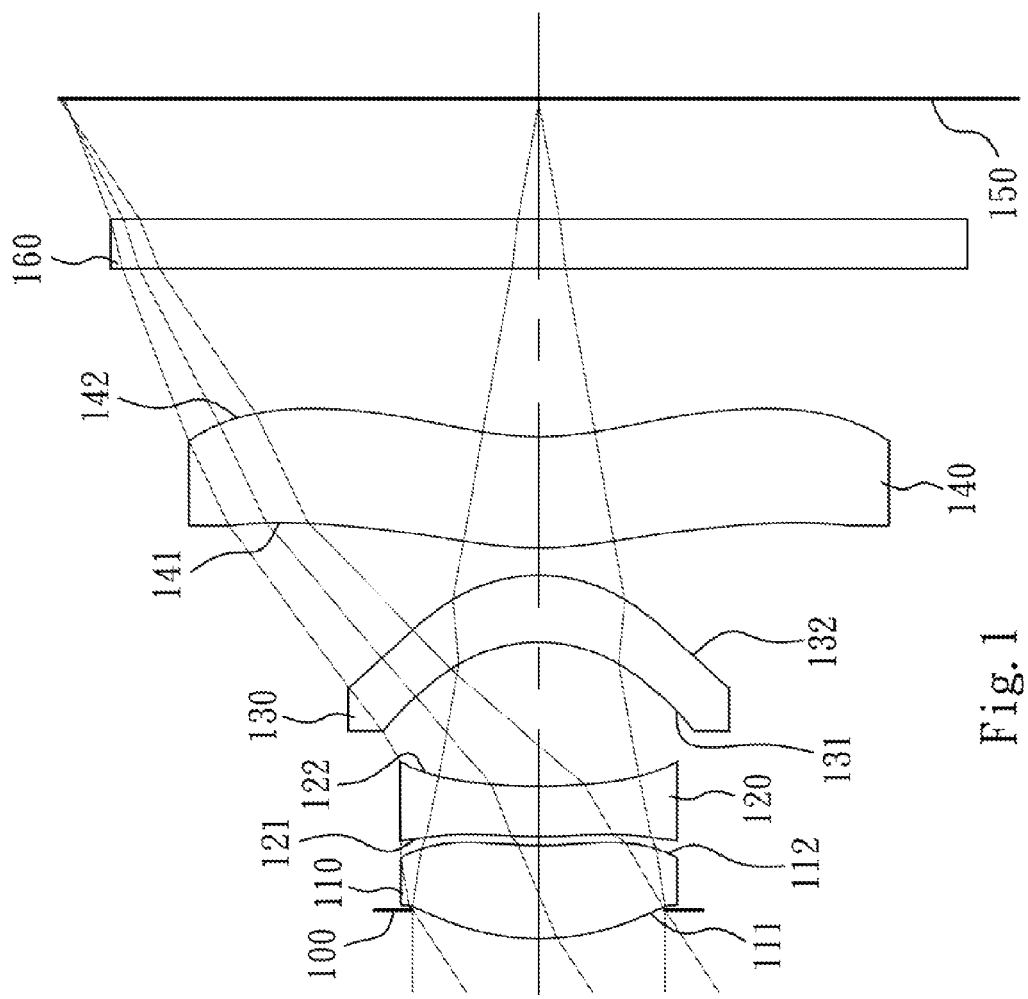
FIG. 1 is a schematic view of a photographing optical lens assembly according to the first embodiment of the present invention.

A photographing optical lens assembly includes, in order from an object side to an image side: a first lens element, a second lens element, a third lens its element and a fourth lens element. The photographing optical lens assembly further includes an image sensor located on the image plane.

The first lens element with positive refractive power provides partial refractive power for reducing the total track length of the photographing optical lens assembly. The first lens element can have a convex object-side surface and a convex image-side surface or a convex object-side surface and a concave image-side surface. When the first lens element has a convex object-side surface and a convex image-side surface, the refractive power thereof can be effectively enhanced, thus allowing further reduction of the total track length of the photographing optical lens assembly. When the first lens element has a convex object-side surface and a concave image-side surface, such as a meniscus, the astigmatism of the photographing optical lens assembly can be corrected.

The second lens element with positive refractive power provides main refractive power for reducing the total track length of the photographing optical lens assembly. Furthermore, the second lens element with positive refractive power can reduce the photosensitivity of the photographing optical lens assembly by providing a partial distribution of the refractive power of the first lens element. The second lens element can have a convex object-side surface and a convex image-side surface, or can be a meniscus, which has a concave object-side surface and a convex image-side surface or a convex object-side surface and a concave image-side surface. When the second lens element has a convex object-side surface, the positive refractive power of the second lens element can be enhanced for reducing the total track length of the photographing optical lens assembly. When the second lens element has a concave object-side surface, the astigmatism of the photographing optical lens assembly can be corrected while increasing the image quality thereof.

The third lens element with positive refractive power can further reduce the photosensitivity of the photographing optical lens assembly by providing a partial distribution of the refractive power of the first lens element. The third lens element can be a meniscus, which has a concave object-side surface and a convex image-side surface or a convex object-side surface and a concave image-side surface. Therefore, the aberration of the photographing optical lens element can be corrected effectively.

The fourth lens element with positive refractive power can correct the high order aberration of the photographing optical lens assembly while enhancing the resolving power thereof. The fourth lens element can have a convex object-side surface and a concave image-side surface, so that the high order aberration and the astigmatism of the photographing optical lens assembly can be further corrected.

An axial distance from the object-side surface of the first lens element to the image plane is TTL, a maximum image height of the photographing optical lens assembly is Y, and they satisfy the following relationship:

$$TTL/Y<2.1.$$

Therefore, the total track length of the photographing optical lens assembly can be reduced for applications on light-weight and portable electronic products.

A focal length of the photographing optical lens assembly is f, a focal length of the second lens element is f2, a focal length of the third lens element is f3, a focal length of the fourth lens element is f4, and they satisfy the following relationship:

$$|f/f2|+|f/f3|+|f/f4|<1.15.$$

Therefore, the aberration of the photographing optical lens assembly can be corrected by the refractive power of the second lens element, the third lens is element and the fourth lens element.

f2, f3 and f4 can further satisfy the following relationship:

$$|f/f2|+|f/f3|+|f/f4|<0.8.$$

The photographing optical lens assembly further includes a stop, which can be an aperture stop, wherein an axial distance between the stop and the image plane is SL, an axial distance from the object-side surface of the first lens element to the image plane is TTL, and they satisfy the following relationship:

$$0.7<SL/TTL<1.2.$$

When the SL/TTL<0.7, the angle of incidence to the image sensor will be too large, which would cause poor photographic performance of the image sensor as well as excessive chromatic aberrations within the photographing optical lens assembly. When the SL/TTL>1.2, the total track length of the photographing optical lens assembly would be longer than desirable. Therefore, when SL/TTL satisfies the above relationship, the photographing optical lens assembly can obtain the telecentric characteristic and the wide-angle characteristic with maintaining a desirable total track length of the photographing optical lens assembly.

A central thickness of the second lens element is CT2, the focal length of the photographing optical lens assembly is f, and they satisfy the following relationship:

0.02<CT2/f<0.15.

Therefore, the size of the photographing optical lens assembly can be miniaturized and the manufacture of the photographing optical lens assembly is easier by the thickness of the second lens element.

A curvature radius of the object-side surface of the third lens element is is R5, a curvature radius of the image-side surface of the third lens element is R6, and they satisfy the following relationships:

0.7<R5/R6<1.2.

Therefore, the astigmatism of the photographing optical lens assembly can be corrected.

A curvature radius of the object-side surface of the fourth lens element is R7, a curvature radius of the image-side surface of the fourth lens element is R8, and they satisfy the following relationship:

0.8<R7/R8<1.3.

Therefore, the high order aberration of the photographing optical lens assembly can be corrected.

According to the photographing optical lens assembly of the present invention, if a lens element has a convex surface, it means that the paraxial region of the surface is convex, and if a lens element has a concave surface, it means that the paraxial region of the surface is concave.

According to the photographing optical lens assembly of the present invention, a lens element can be made of glass material or plastic material. When the lens element is made of glass material, the distribution of degree of freedom of the refractive power of the photographing optical lens assembly can be increased. When the lens element is made of plastic material, the cost of manufacturing can be effectively reduced.

Additionally, the surfaces of the lens element can be aspheric, so as to easily form the surfaces into non-spherical profiles, thereby obtaining more controllable variables for reducing aberration and amount of the required lens elements. Therefore, the total track length of the photographing optical lens assembly can be reduced.

According to the photographing optical lens assembly of the present invention, the photographing optical lens assembly can include at least one stop for reducing stray light while retaining high image quality.

According to the above description of the present invention, the following 1st-9th specific embodiments are provided for further explanation.

Figure 2:
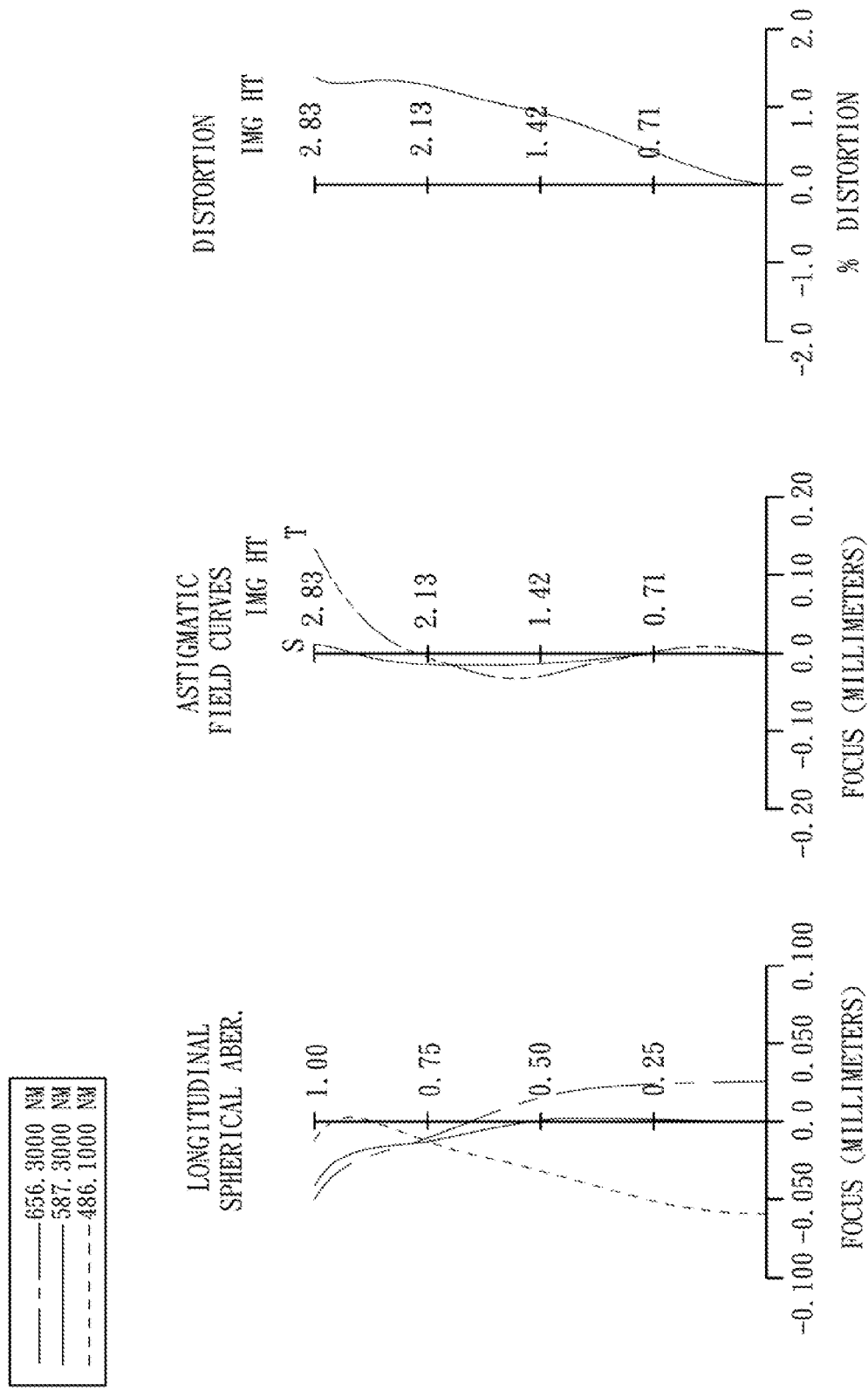
FIG. 2 shows spherical aberration curves, astigmatic field curves and distortion curve of the photographing optical lens assembly according to the first is embodiment of the present invention.

FIG. 1 is a schematic view of a photographing optical lens assembly according to the first embodiment of the present invention. FIG. 2 shows spherical aberration curves, astigmatic field curves and distortion curve of the photographing optical lens assembly according to the first embodiment of the present invention. In FIG. 1, the photographing optical lens assembly includes, in order from an object side to an image side: an aperture stop 100, the first lens element 110, the second lens element 120, the third lens element 130, the fourth lens element 140, an IR (infrared) cut filter 160 and an image plane 150.

The first lens element 110 is made of plastic material. The first lens element 110 with positive refractive power has a convex object-side surface 111 and a concave image-side surface 112. The object-side surface 111 and the image-side surface 112 of the first lens element 110 are aspheric.

The second lens element 120 is made of plastic material. The second lens element 120 with positive refractive power has a convex object-side surface 121 and a concave image-side surface 122. The object-side surface 121 and the concave image-side surface 122 of the second lens element 120 are aspheric.

The third lens element 130 is made of plastic material. The third lens element 130 with positive refractive power has a concave object-side surface 131 and a convex image-side surface 132. The object-side surface 131 and the image-side surface 132 of the third lens element 130 are aspheric.

The fourth lens element 140 is made of plastic material. The fourth lens element 140 with positive refractive power has a convex object-side surface 141 and a concave image-side surface 142. The object-side surface 141 and the image-side surface 142 of the fourth lens element 140 are aspheric, and at least one inflection point is formed on the object-side surface 141 and the image-side surface 142 of the fourth lens element 140 respectively.

The IR cut filter 160 is made of glass and is located between the fourth lens element 140 and the image plane 150 with no influence on the focal length of the photographing optical lens assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient.

In the photographing optical lens assembly, f is a focal length of the photographing optical lens assembly, Fno is an f-number of, the photographing is optical lens assembly, HFOV is half of the maximal field of view, and they satisfy the following relationships:

f=4.28 mm;

Fno=2.85; and

HFOV=33.3 degrees.

In the photographing optical lens assembly according to the first embodiment, f is the focal length of the photographing optical lens assembly, f2 is a focal length of the second lens element 120, f3 is a focal length of the third lens element 130, f4 is a focal length of the fourth lens element 140, and they satisfy the following relationship:

|f/f2|+|f/f3|+|f/f4|=0.20.

In the photographing optical lens assembly according to the first embodiment, f is the focal length of the photographing optical lens assembly, CT2 is a central thickness of the second lens element 120, and they satisfy the following relationship:

CT2/f=0.07.

In the photographing optical lens assembly according to the first embodiment, R5 is a curvature radius of the object-side surface 131 of the third lens element 130, R6 is a curvature radius of the image-side surface 132 of the third lens element 130, R7 is a curvature radius of the object-side surface 141 of the fourth lens element 140, R8 is a curvature radius of the image-side surface 142 of the fourth lens element 140, and they satisfy the following relationships:

$R5/R6=0.90$; and $R7/R8=1.10$.

In the photographing optical lens assembly according to the first embodiment, SL is an axial distance between the aperture stop 100 and the image plane 150, TTL is an axial distance from the object-side surface 111 of the first lens element 110 to the image plane 150, and they satisfy the following relationship:

$TTL/Y=1.73$.

The detailed optical data of the first embodiment is shown in Table 1, and the aspheric surface data is shown in Table 2 as follows.

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th. All labels for Tables of the remaining embodiments share the same definitions as those in Table 1 and Table 2 of the first embodiment, and their definitions will not be stated again.

Figure 3:
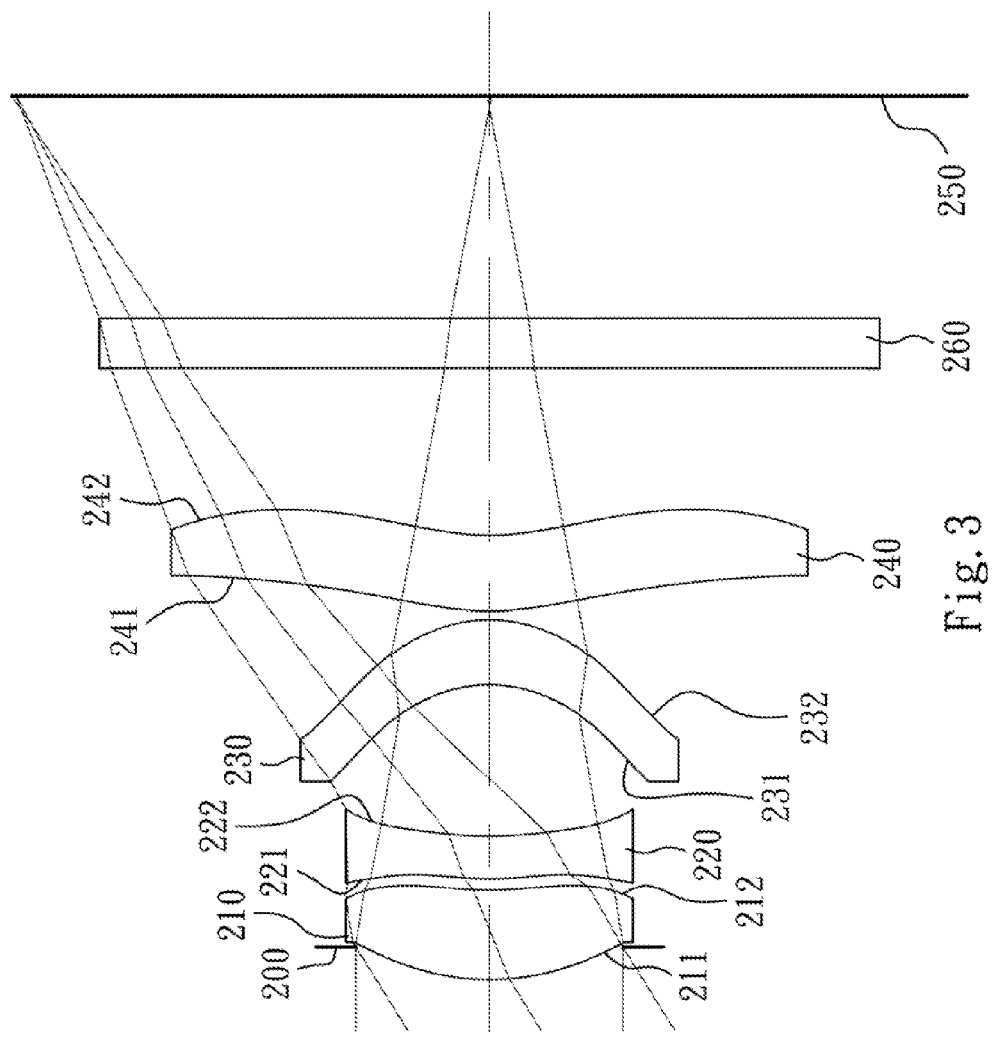
FIG. 3 is a schematic view of a photographing optical lens assembly according to the second embodiment of the present invention.
Figure 4:
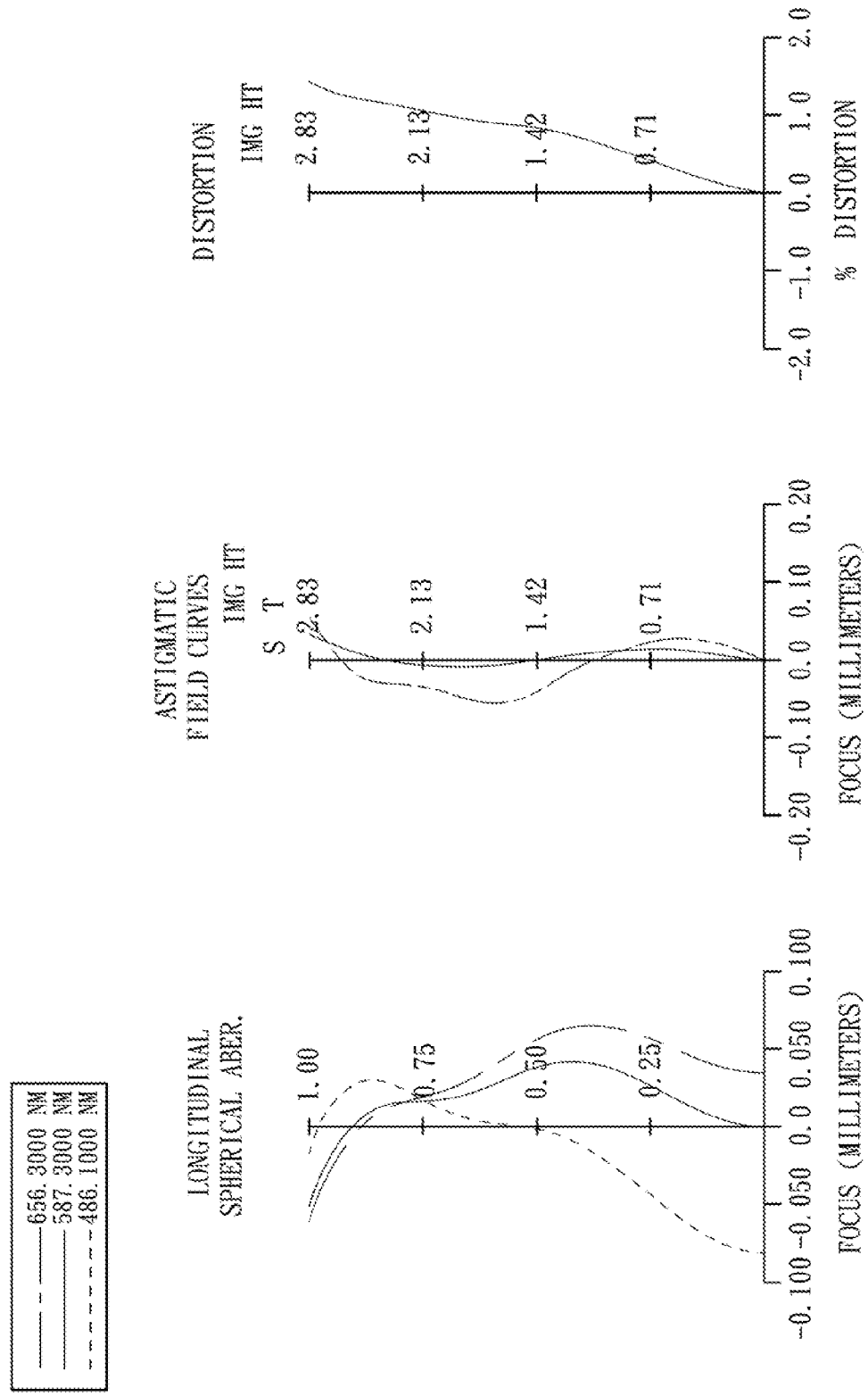
FIG. 4 shows spherical aberration curves, astigmatic field curves and distortion curve of the photographing optical lens assembly according to the second embodiment of the present invention.

FIG. 3 is a schematic view of a photographing optical lens assembly according to the second embodiment of the present invention. FIG. 4 shows spherical aberration curves, astigmatic field curves and distortion curve of the photographing optical lens assembly according to the second embodiment of the present invention. In FIG. 3, the photographing optical lens assembly includes, in order from an object side to an image side: an aperture stop 200, the first lens element 210, the second lens element 220, the third lens element 230, the fourth lens element 240, an IR (infrared) cut filter 260 and an image plane 250.

TABLE 1

1st Embodiment
f = 4.28 mm, FNO = 2.85, HFOV = 33.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.169 | | | | |
| 2 | Lens 1 | 1.460430 (ASP) | 0.557 | Plastic | 1.544 | 55.9 | 5.01 |
| 3 | | 2.725290 (ASP) | 0.050 | | | | |
| 4 | Lens 2 | 3.196200 (ASP) | 0.300 | Plastic | 1.632 | 23.4 | 101.28 |
| 5 | | 3.241900 (ASP) | 0.860 | | | | |
| 6 | Lens 3 | −0.864730 (ASP) | 0.395 | Plastic | 1.544 | 55.9 | 38.64 |
| 7 | | −0.964270 (ASP) | 0.162 | | | | |
| 8 | Lens 4 | 1.872190 (ASP) | 0.662 | Plastic | 1.544 | 55.9 | 93.02 |
| 9 | | 1.701850 (ASP) | 1.000 | | | | |
| 10 | IR-filter | Plano | 0.300 | Glass | 1.517 | 64.2 | — |
| 11 | | Plano | 0.716 | | | | |
| 12 | Image | Plano | — | | | | |

The reference wavelength (d-line) is 587.6 nm

TABLE 2

Aspheric Coefficients

| Surface # | 2 | 3 | 4 | 5 |
|---|---|---|---|---|
| k = | −6.95869E−01 | −1.00000E+00 | −1.00000E+00 | −1.90958E+01 |
| A4 = | 5.73420E−03 | −5.33671E−01 | −5.04292E−01 | 1.30308E−02 |
| A6 = | −1.00146E−02 | −3.60266E−02 | 8.52542E−02 | 1.66116E−01 |
| A8 = | 1.23110E−01 | 6.00625E−01 | 5.82525E−01 | 1.66505E−01 |
| A10 = | −4.06945E−01 | −3.61951E−01 | −1.52540E−01 | −4.02273E−01 |
| A12 = | 1.93390E−01 | −1.98789E−01 | −1.80119E−01 | 4.08541E−01 |
| A14 = | 1.39943E−01 | −9.49336E−02 | −5.28239E−01 | 1.53861E−02 |
| A16 = | −3.32217E−01 | 1.96850E−01 | 5.99525E−01 | −2.09721E−01 |

| Surface # | 6 | 7 | 8 | 9 |
|---|---|---|---|---|
| k = | −4.73993E+00 | −6.43389E−01 | −1.66996E+01 | −8.92465E+00 |
| A4 = | −6.45941E−01 | −1.01404E−01 | −7.10174E−02 | −7.19955E−02 |
| A6 = | 6.37735E−01 | 1.34686E−01 | 4.24423E−02 | 2.45970E−02 |
| A8 = | −5.40412E−01 | −1.15553E−01 | −1.26548E−02 | −5.22922E−03 |
| A10 = | 2.69392E−01 | 1.38644E−01 | 9.73565E−04 | 4.18655E−04 |
| A12 = | 1.30774E−01 | 4.51398E−03 | 2.61978E−04 | −2.54288E−06 |
| A14 = | 1.72731E−01 | −4.14861E−02 | −4.84819E−05 | 4.75220E−07 |
| A16 = | −3.37538E−01 | 5.20903E−03 | 1.42624E−06 | −1.73950E−07 |

The first lens element 210 is made of plastic material. The first lens element 210 with positive refractive power has a convex object-side surface 211 and a concave image-side surface 212. The object-side surface 211 and the image-side surface 212 of the first lens element 210 are aspheric.

The second lens element 220 is made of plastic material. The second lens element 220 with positive refractive power has a convex object-side surface 221 and a concave image-side surface 222. The object-side surface 221 and the image-side surface 222 of the second lens element 220 are aspheric.

The third lens element 230 is made of plastic material. The third lens element 230 with positive refractive power has a concave object-side surface 231 and a convex image-side surface 232. The object-side surface 231 and the image-side surface 232 of the third lens element 230 are aspheric.

The fourth lens element 240 is made of plastic material. The fourth lens element 240 with positive refractive power has a convex object-side surface 241 and a concave image-side surface 242. The object-side surface 241 and the image-side surface 242 of the fourth lens element 240 are aspheric, and at least one inflection point is formed on the object-side surface 241 and the image-side surface 242 of the fourth lens element 240 respectively.

The IR cut filter 260 is made of glass and is located between the fourth lens element 240 and the image plane 250 with no influence on the focal length of the photographing optical lens assembly.

The equation of the aspheric surface profiles of the aforementioned lens elements of the second embodiment is the same as that of the first embodiment, and will not be stated herein again.

In the photographing optical lens assembly according to the second embodiment, the definitions of f, Fno, HFOV, f2, f3, f4, CT2, R5, R6, R7, R8, SL, TTL and Y are the same as those stated in the first embodiment with corresponding values for the second embodiment, and they satisfy the following relationships:

| | |
|---|---|
| f(mm) | 4.49 |
| Fno | 2.80 |
| HFOV(degrees) | 31.9 |
| $|f/f2| + |f/f3| + |f/f4|$ | 0.65 |
| CT2/f | 0.06 |
| R5/R6 | 0.93 |
| R7/R8 | 1.05 |
| SL/TTL | 0.96 |
| TTL/Y | 1.84 |

The detailed optical data of the second embodiment is shown in Table 3, and the aspheric surface data is shown in Table 4 as follows.

TABLE 3

2nd Embodiment
f = 4.49 mm, FNO = 2.80, HFOV = 31.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.195 | | | | |
| 2 | Lens 1 | 1.491110 (ASP) | 0.538 | Plastic | 1.544 | 55.9 | 8.56 |
| 3 | | 1.913900 (ASP) | 0.070 | | | | |
| 4 | Lens 2 | 1.904750 (ASP) | 0.253 | Plastic | 1.634 | 23.8 | 14.98 |
| 5 | | 2.259880 (ASP) | 0.910 | | | | |
| 6 | Lens 3 | −0.813310 (ASP) | 0.393 | Plastic | 1.530 | 55.8 | 17.11 |
| 7 | | −0.871310 (ASP) | 0.050 | | | | |
| 8 | Lens 4 | 1.527860 (ASP) | 0.458 | Plastic | 1.530 | 55.8 | 51.65 |
| 9 | | 1.450160 (ASP) | 1.000 | | | | |
| 10 | IR-filter | Plano | 0.300 | Glass | 1.517 | 64.2 | — |
| 11 | | Plano | 1.339 | | | | |
| 12 | Image | Plano | — | | | | |

The reference wavelength (d-line) is 587.6 nm

TABLE 4

Aspheric Coefficients

| Surface # | 2 | 3 | 4 | 5 |
|---|---|---|---|---|
| k = | −7.73684E−01 | −1.00000E+00 | −1.00000E+00 | −9.87760E+00 |
| A4 = | 7.26090E−04 | −6.40004E−01 | −7.58472E−01 | −1.71701E−01 |
| A6 = | 4.33702E−02 | 1.39135E−01 | 1.25610E−01 | 1.66189E−01 |
| A8 = | 3.82962E−02 | 5.39360E−01 | 1.10914E+00 | 5.62443E−01 |
| A10 = | −2.71197E−01 | −3.94918E−01 | −6.61511E−01 | −7.27641E−01 |
| A12 = | 1.93390E−01 | −1.98789E−01 | −1.80119E−01 | 4.08541E−01 |
| A14 = | 1.39943E−01 | −9.49336E−02 | −5.28239E−01 | 1.53861E−02 |
| A16 = | −3.32217E−01 | 1.96850E−01 | 5.99525E−01 | −2.09721E−01 |

| Surface # | 6 | 7 | 8 | 9 |
|---|---|---|---|---|
| k = | −4.71989E+00 | −6.91110E−01 | −1.41527E+01 | −1.07813E+01 |
| A4 = | −6.37771E−01 | −1.92678E−02 | −6.74142E−02 | −8.49049E−02 |
| A6 = | 5.43891E−01 | 4.65501E−02 | 4.04117E−02 | 3.30183E−02 |
| A8 = | −6.48104E−01 | −1.40890E−01 | −1.23921E−02 | −7.79866E−03 |

TABLE 4-continued

| Aspheric Coefficients | | | |
|---|---|---|---|
| A10 = | 4.78222E−01 | 1.67754E−01 | 1.03005E−03 | 5.66904E−04 |
| A12 = | 1.30774E−01 | 2.49300E−02 | 2.64036E−04 | 4.24885E−05 |
| A14 = | 1.72731E−01 | −2.48886E−02 | −3.16242E−05 | 9.16497E−06 |
| A16 = | −3.37538E−01 | −1.12975E−02 | −2.95884E−06 | −2.65366E−06 |

Figure 5:
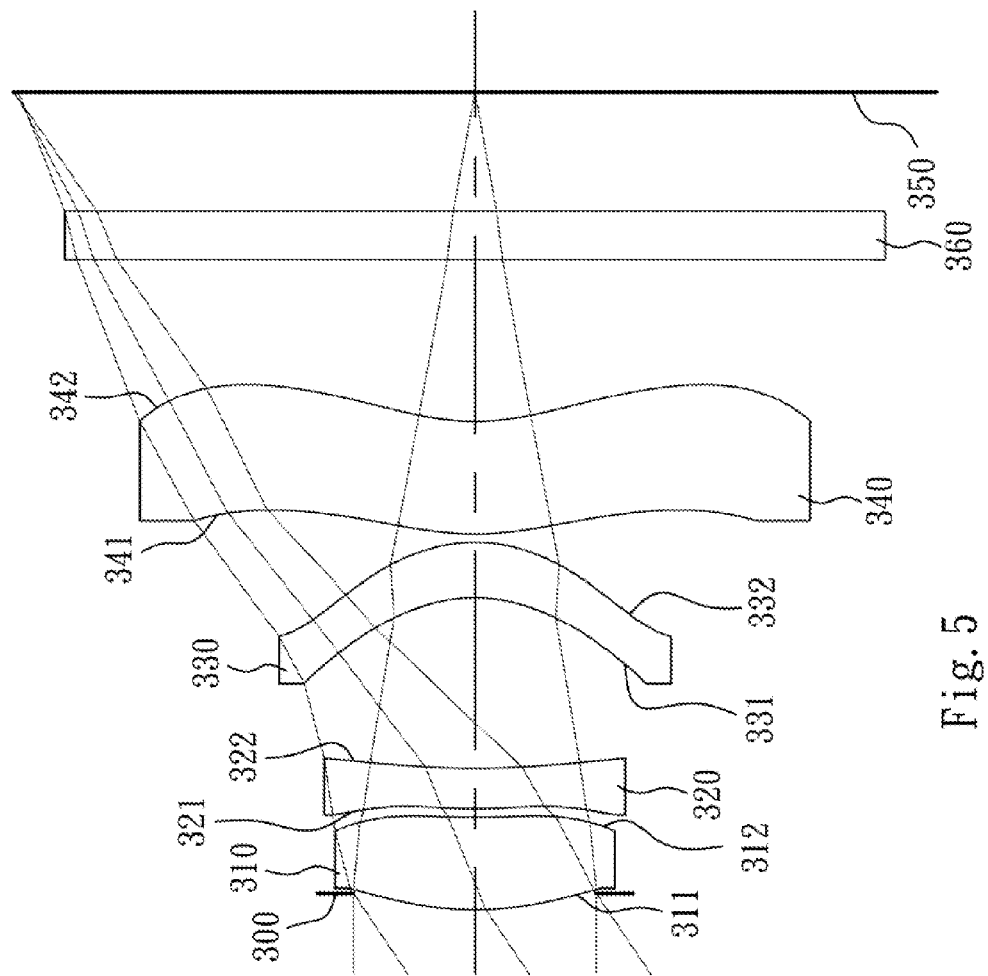
FIG. 5 is a schematic view of a photographing optical lens assembly according to the third embodiment of the present invention.
Figure 6:
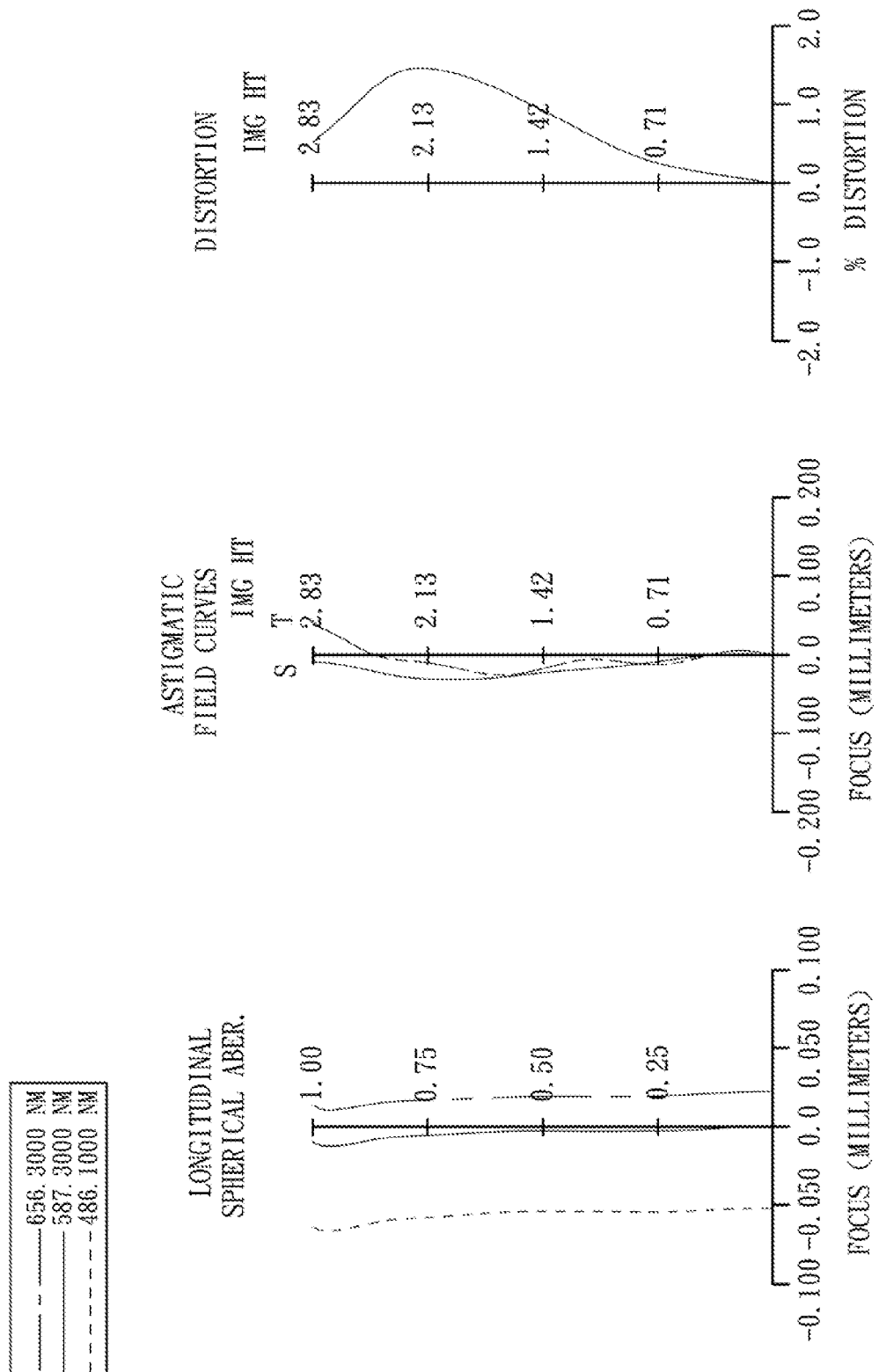
FIG. 6 shows spherical aberration curves, astigmatic field curves and distortion curve of the photographing optical lens assembly according to the third embodiment of the present invention.

FIG. 5 is a schematic view of a photographing optical lens assembly according to the third embodiment of the present invention. FIG. 6 shows spherical aberration curves, astigmatic field curves and distortion curve of the photographing optical lens assembly according to the third embodiment of the present invention. In FIG. 5, the photographing optical lens assembly includes, in order from an object side to an image side: an aperture stop 300, the first lens element 310, the second lens element 320, the third lens element 330, the fourth lens element 340, an IR (infrared) cut filter 360 and an image plane 350.

The first lens element 310 is made of plastic material. The first lens element 310 with positive refractive power has a convex object-side surface 311 and a concave image-side surface 312. The object-side surface 311 and the image-side surface 312 of the first lens element 310 are aspheric.

The second lens element 320 is made of plastic material. The second lens element 320 with positive refractive power has a convex object-side surface 321 and a concave image-side surface 322. The object-side surface 321 and the image-side surface 322 of the second lens element 320 are aspheric.

The third lens element 330 is made of plastic material. The third lens element 330 with positive refractive power has a concave object-side surface 331 and a convex image-side surface 332. The object-side surface 331 and the image-side surface 332 of the third lens element 330 are aspheric.

The fourth lens element 340 is made of plastic material. The fourth lens element 340 with positive refractive power has a convex object-side surface 341 and a concave image-side surface 342. The object-side surface 341 and the image-side surface 342 of the fourth lens element 340 are aspheric, and at least one inflection point is formed on the object-side surface 341 and the image-side surface 342 of the fourth lens element 340 respectively.

The IR cut filter 360 is made of glass and is located between the fourth lens element 340 and the image plane 350 with no influence on the focal length of the photographing optical lens assembly.

The equation of the aspheric surface profiles of the aforementioned lens elements of the third embodiment is the same as that of the first embodiment, and will not be stated herein again.

In the photographing optical lens assembly according to the third embodiment, the definitions of f, Fno, HFOV, f2, f3, f4, CT2, R5, R6, R7, R8, SL, TTL and Y are the same as those stated in the first embodiment with corresponding values for the third embodiment, and they satisfy the following relationships:

| | |
|---|---|
| f(mm) | 4.19 |
| Fno | 2.80 |
| HFOV(degrees) | 34.0 |
| $|f/f2| + |f/f3| + |f/f4|$ | 0.48 |
| CT2/f | 0.06 |
| R5/R6 | 0.92 |
| R7/R8 | 1.14 |
| SL/TTL | 0.98 |
| TTL/Y | 1.74 |

The detailed optical data of the third embodiment is shown in Table 5, and the aspheric surface data is shown in Table 6 as follows.

TABLE 5

3rd Embodiment
f = 4.19 mm, FNO = 2.80, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.100 | | | | |
| 2 | Lens 1 | 2.022750 (ASP) | 0.572 | Plastic | 1.544 | 55.9 | 7.52 |
| 3 | | 3.602900 (ASP) | 0.050 | | | | |
| 4 | Lens 2 | 2.776660 (ASP) | 0.250 | Plastic | 1.544 | 55.9 | 12.76 |
| 5 | | 4.480600 (ASP) | 1.057 | | | | |
| 6 | Lens 3 | −0.901050 (ASP) | 0.338 | Plastic | 1.544 | 55.9 | 45.15 |
| 7 | | −0.984070 (ASP) | 0.050 | | | | |
| 8 | Lens 4 | 1.557360 (ASP) | 0.696 | Plastic | 1.544 | 55.9 | 73.30 |
| 9 | | 1.365410 (ASP) | 1.000 | | | | |
| 10 | IR-filter | Plano | 0.300 | Glass | 1.517 | 64.2 | — |
| 11 | | Plano | 0.738 | | | | |
| 12 | Image | Plano | — | | | | |

The reference wavelength (d-line) is 587.6 nm

TABLE 6

Aspheric Coefficients

| Surface # | 2 | 3 | 4 | 5 |
|---|---|---|---|---|
| k = | −1.47712E+00 | 9.38163E+00 | 5.69226E+00 | −1.00000E+00 |
| A4 = | −1.49048E−02 | −5.67165E−01 | −5.88645E−01 | −7.14341E−02 |
| A6 = | −3.20996E−02 | 1.81429E−01 | −3.27211E−02 | −1.23430E−01 |
| A8 = | 1.36434E−01 | 3.07315E−01 | 1.01200E+00 | 5.56557E−01 |
| A10 = | −5.10640E−01 | −2.13971E−01 | −6.34371E−01 | −6.16812E−01 |
| A12 = | 5.44939E−01 | 4.01318E−03 | −1.63857E−01 | 2.50333E−01 |
| A14 = | −4.20719E−02 | −3.26507E−01 | −3.33703E−01 | −1.35918E−01 |
| A16 = | −2.26134E−01 | 2.58610E−01 | 4.66632E−01 | 9.60285E−02 |

| Surface # | 6 | 7 | 8 | 9 |
|---|---|---|---|---|
| k = | −6.45318E+00 | −7.70413E−01 | −1.54699E+01 | −7.49092E+00 |
| A4 = | −4.53130E−01 | −1.40595E−02 | −5.98206E−02 | −6.42043E−02 |
| A6 = | 5.54257E−01 | 1.22310E−01 | 2.82570E−02 | 2.39090E−02 |
| A8 = | −5.57940E−01 | −1.38231E−01 | −1.03730E−02 | −7.23526E−03 |
| A10 = | 3.86017E−01 | 1.22297E−01 | 1.09260E−03 | 9.42809E−04 |
| A12 = | −9.59618E−02 | 3.01829E−03 | 2.11143E−04 | 7.46338E−07 |
| A14 = | 7.63474E−04 | −3.98952E−02 | −3.50931E−05 | −1.43131E−05 |
| A16 = | −2.01763E−02 | 1.16151E−02 | −4.70123E−07 | 1.05971E−06 |

Figure 7:
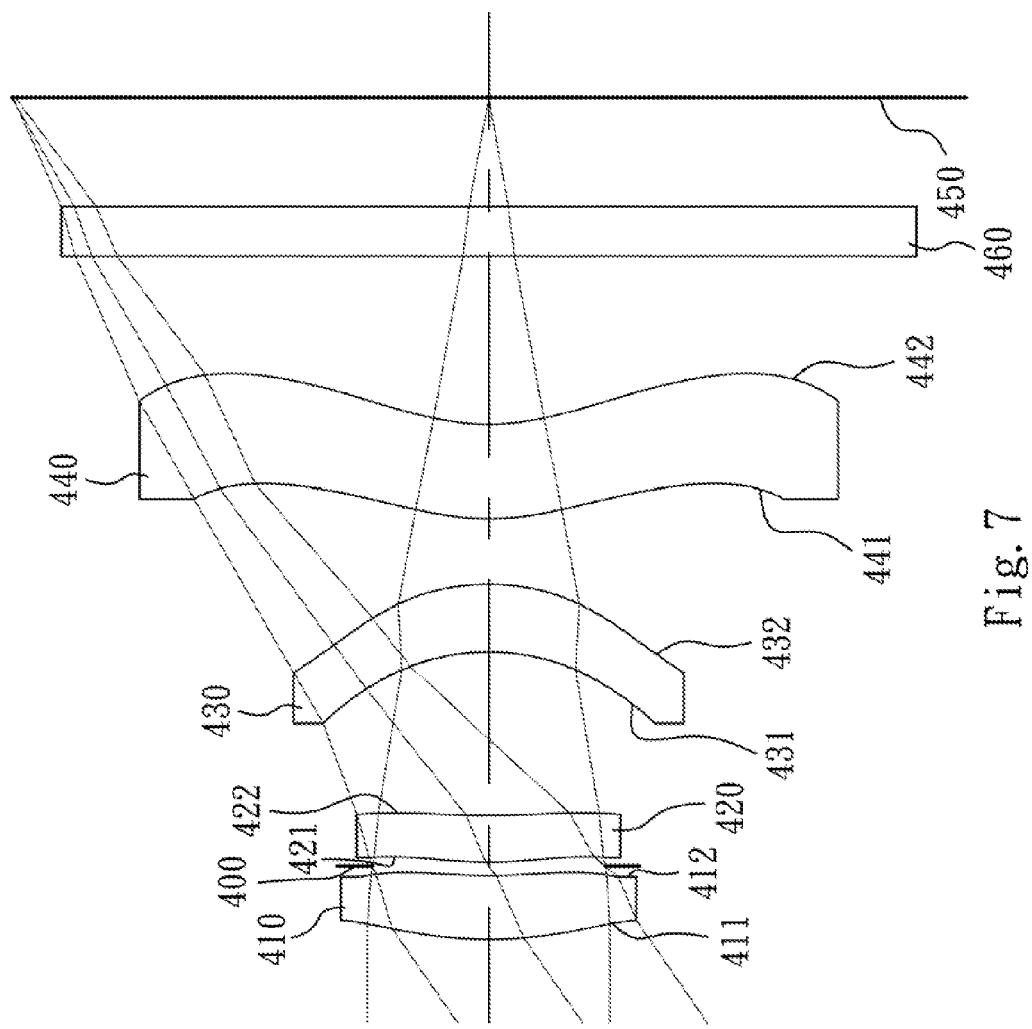
FIG. 7 is a schematic view of a photographing optical lens assembly according to the fourth embodiment of the present invention.
Figure 8:
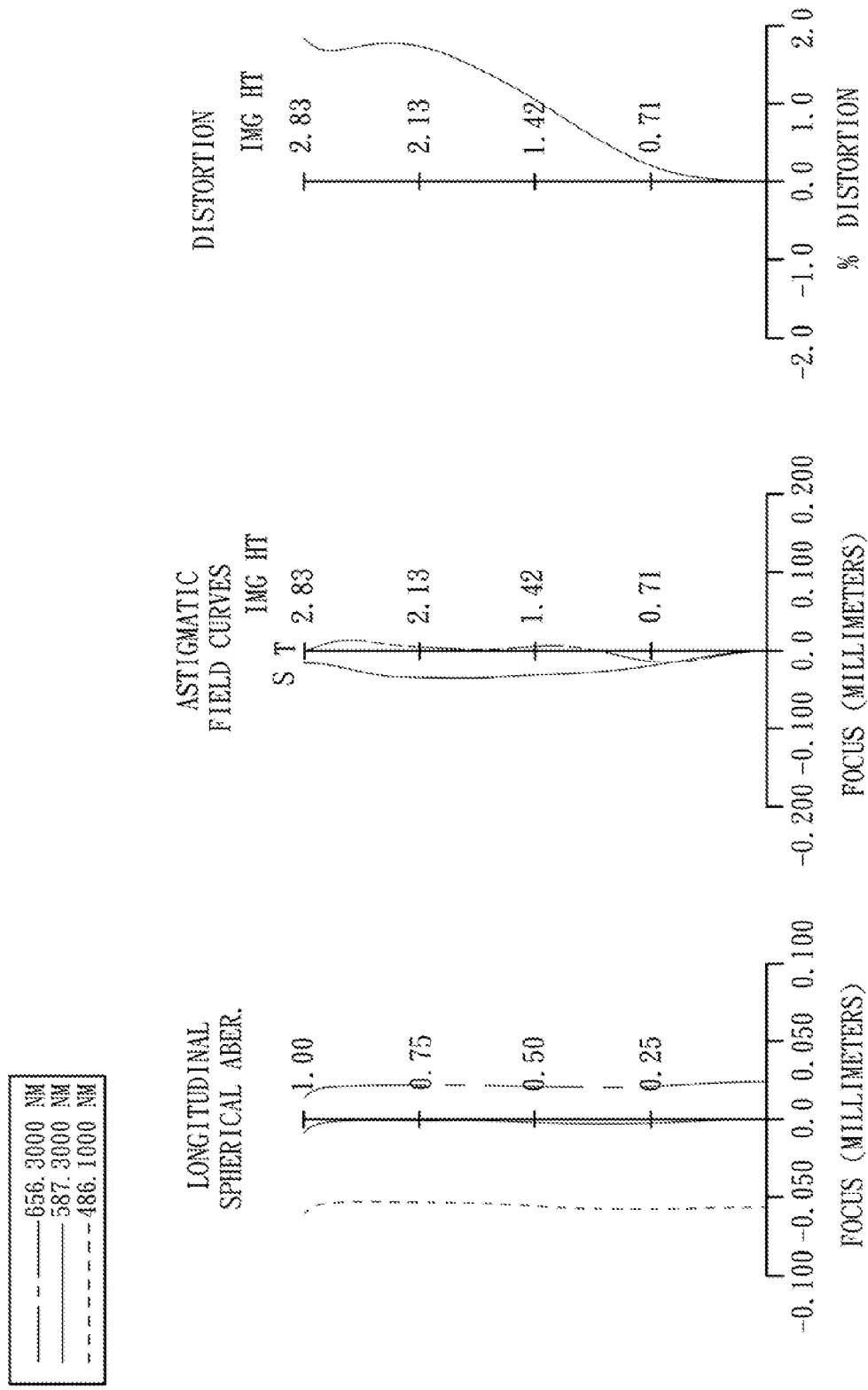
FIG. 8 shows spherical aberration curves, astigmatic field curves and distortion curve of the photographing optical lens assembly according to the fourth embodiment of the present invention.

FIG. 7 is a schematic view of a photographing optical lens assembly according to the fourth embodiment of the present invention. FIG. 8 shows spherical aberration curves, astigmatic field curves and distortion curve of the photographing optical lens assembly according to the fourth embodiment of the present invention. In FIG. 7, the photographing optical lens assembly includes, in order from an object side to an image side: the first lens element 410, an aperture stop 400, the second lens element 420, the third lens element 430, the fourth lens element 440, an IR (infrared) cut filter 460 and an image plane 450.

The first lens element 410 is made of plastic material. The first lens element 410 with positive refractive power has a convex object-side surface 411 and a concave image-side surface 412. The object-side surface 411 and the image-side surface 412 of the first lens element 410 are aspheric.

The second lens element 420 is made of plastic material. The second is lens element 420 with positive refractive power has a convex object-side surface 421 and a concave image-side surface 422. The object-side surface 421 and the image-side surface 422 of the second lens element 420 are aspheric.

The third lens element 430 is made of plastic material. The third lens element 430 with positive refractive power has a concave object-side surface 431 and a convex image-side surface 432. The object-side surface 431 and the image-side surface 432 of the third lens element 430 are aspheric.

The fourth lens element 440 is made of plastic material. The fourth lens element 440 with positive refractive power has a convex object-side surface 441 and a concave image-side surface 442. The object-side surface 441 and the image-side surface 442 of the fourth lens element 440 are aspheric, and at least one inflection point is formed on the object-side surface 441 and the image-side surface 442 of the fourth lens element 440 respectively.

The IR cut filter 460 is made of glass and is located between the fourth lens element 440 and the image plane 450 with no influence on the focal length of the photographing optical lens assembly.

The equation of the aspheric surface profiles of the aforementioned lens elements of the fourth embodiment is the same as that of the first embodiment, and will not be stated herein again.

In the photographing optical lens assembly according to the fourth embodiment, the definitions of f, Fno, HFOV, f2, f3, f4, CT2, R5, R6, R7, R8, SL, TTL and Y are the same as those stated in the first embodiment with corresponding values for the fourth embodiment, and they satisfy the following relationships:

| | |
|---|---|
| f(mm) | 4.03 |
| Fno | 2.80 |
| HFOV(degrees) | 34.7 |
| $|f/f2| + |f/f3| + |f/f4|$ | 0.79 |
| CT2/f | 0.07 |
| R5/R6 | 0.95 |
| R7/R8 | 1.13 |
| SL/TTL | 0.91 |
| TTL/Y | 1.73 |

The detailed optical data of the fourth embodiment is shown in Table 7, and the aspheric surface data is shown in Table 8 as follows.

TABLE 7

4th Embodiment
f = 4.03 mm, FNO = 2.80, HFOV = 34.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.318970 (ASP) | 0.383 | Plastic | 1.544 | 55.9 | 15.93 |
| 2 | | 2.981740 (ASP) | 0.057 | | | | |
| 3 | Ape. Stop | Plano | 0.023 | | | | |
| 4 | Lens 2 | 2.327570 (ASP) | 0.276 | Plastic | 1.544 | 55.9 | 6.33 |
| 5 | | 6.874800 (ASP) | 0.971 | | | | |

TABLE 7-continued

4th Embodiment
f = 4.03 mm, FNO = 2.80, HFOV = 34.7 deg.

| Surface # | | Curvature Radius | Thickness | Material | Index | Abbe # | Focal length |
|---|---|---|---|---|---|---|---|
| 6 | Lens 3 | −1.297910 (ASP) | 0.403 | Plastic | 1.544 | 55.9 | 43.05 |
| 7 | | −1.364330 (ASP) | 0.393 | | | | |
| 8 | Lens 4 | 1.484510 (ASP) | 0.559 | Plastic | 1.634 | 23.8 | 71.30 |
| 9 | | 1.310660 (ASP) | 1.000 | | | | |
| 10 | IR-filter | Plano | 0.300 | Glass | 1.517 | 64.2 | — |
| 11 | | Plano | 0.648 | | | | |
| 12 | Image | Plano | — | | | | |

The reference wavelength (d-line) is 587.6 nm.

TABLE 8

Aspheric Coefficients

| Surface # | 1 | 2 | 4 | 5 |
|---|---|---|---|---|
| k = | −2.72537E+00 | 8.40627E+00 | 6.50721E+00 | −1.00000E+00 |
| A4 = | −4.80075E−02 | −4.74151E−01 | −4.64063E−01 | −5.95479E−02 |
| A6 = | −2.35996E−02 | 1.52570E−01 | −9.96087E−02 | −2.79607E−01 |
| A8 = | 9.00756E−02 | 2.28954E−01 | 5.96683E−01 | 7.94571E−01 |
| A10 = | −2.95967E−01 | −4.12208E−01 | −3.84850E−01 | −1.00587E+00 |
| A12 = | 2.95482E−01 | 1.93594E−01 | −3.78069E−01 | 2.94602E−01 |
| A14 = | −3.21880E−02 | −2.83460E−01 | −5.16978E−01 | 2.75226E−01 |
| A16 = | −1.07695E−01 | 1.96849E−01 | 5.99524E−01 | −2.09722E−01 |

| Surface # | 6 | 7 | 8 | 9 |
|---|---|---|---|---|
| k = | −9.42993E+00 | −5.53369E−01 | −6.48301E+00 | −4.35565E+00 |
| A4 = | −4.76813E−01 | −1.52630E−01 | −8.09597E−02 | −7.49222E−02 |
| A6 = | 5.72409E−01 | 1.93503E−01 | 2.94590E−02 | 2.62365E−02 |
| A8 = | −5.72808E−01 | −1.57333E−01 | −7.18998E−03 | −6.85134E−03 |
| A10 = | 3.68662E−01 | 1.11623E−01 | 6.25853E−04 | 8.49345E−04 |
| A12 = | −6.70848E−02 | 7.51353E−03 | −4.29792E−06 | −1.43454E−05 |
| A14 = | 5.10606E−03 | −4.15997E−02 | −2.57778E−05 | −1.13135E−05 |
| A16 = | −4.92279E−02 | 1.21257E−02 | 5.27492E−06 | 1.09098E−06 |

Figure 9:
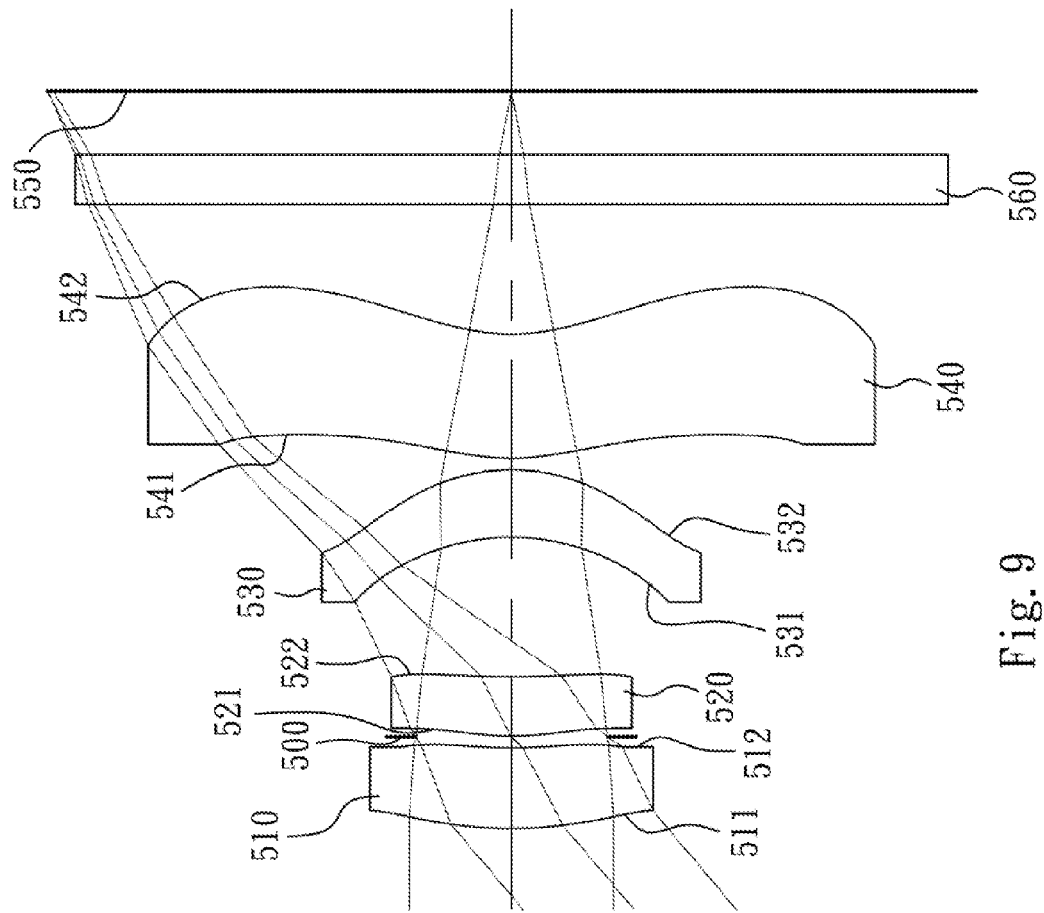
FIG. 9 is a schematic view of a photographing optical lens assembly according to the fifth embodiment of the present invention.
Figure 10:
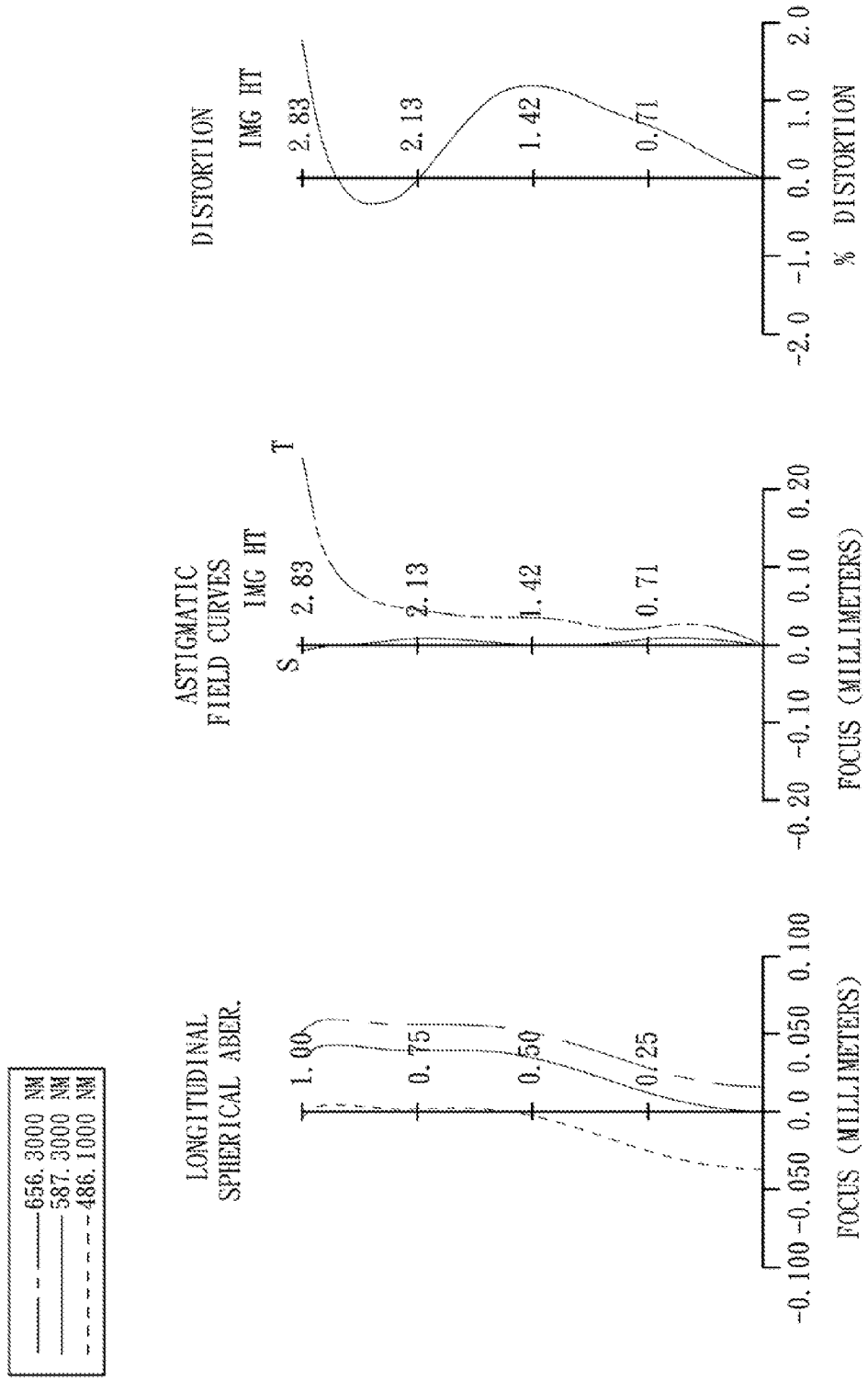
FIG. 10 shows spherical aberration curves, astigmatic field curves and distortion curve of the photographing optical lens assembly according to the fifth embodiment of the present invention.

FIG. 9 is a schematic view of a photographing optical lens assembly according to the fifth embodiment of the present invention. FIG. 10 shows spherical aberration curves, astigmatic field curves and distortion curve of the photographing optical lens assembly according to the fifth embodiment of the present invention. In FIG. 9, the photographing optical lens assembly includes, in order from an object side to an image side: the first lens element 510, an aperture stop 500, the second lens element 520, the third lens element 530, the fourth lens element 540, an IR (infrared) cut filter 560 and an image plane 550.

The first lens element 510 is made of plastic material. The first lens element 510 with positive refractive power has a convex object-side surface 511 and a concave image-side surface 512. The object-side surface 511 and the image-side surface 512 of the first lens element 510 are aspheric.

The second lens element 520 is made of plastic material. The second is lens element 520 with positive refractive power has a convex object-side surface 521 and a concave image-side surface 522. The object-side surface 521 and the image-side surface 522 of the second lens element 520 are aspheric.

The third lens element 530 is made of plastic material. The third lens element 530 with positive refractive power has a concave object-side surface 531 and a convex image-side surface 532. The object-side surface 531 and the image-side surface 532 of the third lens element 530 are aspheric.

The fourth lens element 540 is made of plastic material. The fourth lens element 540 with positive refractive power has a convex object-side surface 541 and a concave image-side surface 542. The object-side surface 541 and the image-side surface 542 of the fourth lens element 540 are aspheric, and at least one inflection point is formed on the object-side surface 541 and the image-side surface 542 of the fourth lens element 540 respectively.

The IR cut filter 560 is made of glass and is located between the fourth lens element 540 and the image plane 550 with no influence on the focal length of the photographing optical lens assembly.

The equation of the aspheric surface profiles of the aforementioned lens elements of the fifth embodiment is the same as that of the first embodiment, and will not be stated herein again.

In the photographing optical lens assembly according to the fifth embodiment, the definitions of f, Fno, HFOV, f2, f3, f4, CT2, R5, R6, R7, R8, SL, TTL and Y are the same as those stated in the first embodiment with corresponding values for the fifth embodiment, and they satisfy the following relationships:

| | |
|---|---|
| f(mm) | 3.31 |
| Fno | 2.65 |
| HFOV(degrees) | 40.0 |
| \|f/f2\| + \|f/f3\| + \|f/f4\| | 0.87 |
| CT2/f | 0.11 |
| R5/R6 | 0.97 |
| R7/R8 | 1.17 |
| SL/TTL | 0.87 |
| TTL/Y | 1.56 |

The detailed optical data of the fifth embodiment is shown in Table 9, and the aspheric surface data is shown in Table 10 as follows.

TABLE 9

5th Embodiment
f = 3.31 mm, FNO = 2.65, HFOV = 40.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.495550 (ASP) | 0.491 | Plastic | 1.544 | 55.9 | 20.63 |
| 2 | | 2.986530 (ASP) | 0.071 | | | | |
| 3 | Ape. Stop | Plano | 0.005 | | | | |
| 4 | Lens 2 | 1.909370 (ASP) | 0.359 | Plastic | 1.544 | 55.9 | 4.98 |
| 5 | | 6.026900 (ASP) | 0.855 | | | | |
| 6 | Lens 3 | −1.222120 (ASP) | 0.413 | Plastic | 1.544 | 55.9 | 25.95 |
| 7 | | −1.258720 (ASP) | 0.070 | | | | |
| 8 | Lens 4 | 1.371630 (ASP) | 0.759 | Plastic | 1.544 | 55.9 | 41.60 |
| 9 | | 1.175380 (ASP) | 0.800 | | | | |
| 10 | IR-filter | Plano | 0.300 | Glass | 1.517 | 64.2 | — |
| 11 | | Plano | 0.391 | | | | |
| 12 | Image | Plano | — | | | | |

The reference wavelength (d-line) is 587.6 nm.

TABLE 10

Aspheric Coefficients

| Surface # | 1 | 2 | 4 | 5 |
|---|---|---|---|---|
| k = | −2.38182E+00 | 9.67630E+00 | 5.42670E+00 | −1.00000E+00 |
| A4 = | −4.41652E−02 | −4.51161E−01 | −4.85966E−01 | −2.69095E−02 |
| A6 = | −4.35099E−03 | 8.85396E−02 | −1.39199E−01 | −4.04797E−01 |
| A8 = | 6.87866E−02 | 1.60481E−01 | 1.24401E−01 | 6.28661E−01 |
| A10 = | −2.80647E−01 | −4.94451E−01 | −9.82581E−01 | −8.45773E−01 |
| A12 = | 2.87005E−01 | 3.62039E−01 | 5.37440E−01 | 3.62419E−01 |
| A14 = | −4.96093E−02 | −2.83460E−01 | −5.16978E−01 | 2.75226E−01 |
| A16 = | −9.27377E−02 | 1.96849E−01 | 5.99524E−01 | −2.09722E−01 |

| Surface # | 6 | 7 | 8 | 9 |
|---|---|---|---|---|
| k = | −1.42737E+01 | −5.99452E−01 | −1.29161E+01 | −5.03430E+00 |
| A4 = | −4.46437E−01 | −1.53163E−01 | −9.37247E−02 | −7.06039E−02 |
| A6 = | 5.44213E−01 | 2.14348E−01 | 3.71949E−02 | 2.11793E−02 |
| A8 = | −5.81761E−01 | −1.58508E−01 | −6.27375E−03 | −5.99503E−03 |
| A10 = | 3.43269E−01 | 1.14047E−01 | 4.91144E−04 | 9.80392E−04 |
| A12 = | −8.56564E−02 | 1.02177E−02 | −7.63461E−05 | −3.54497E−05 |
| A14 = | 1.16742E−02 | −4.06413E−02 | −2.41887E−05 | −1.27080E−05 |
| A16 = | −3.50206E−02 | 1.08455E−02 | 6.13301E−06 | 1.02081E−06 |

Figure 11:
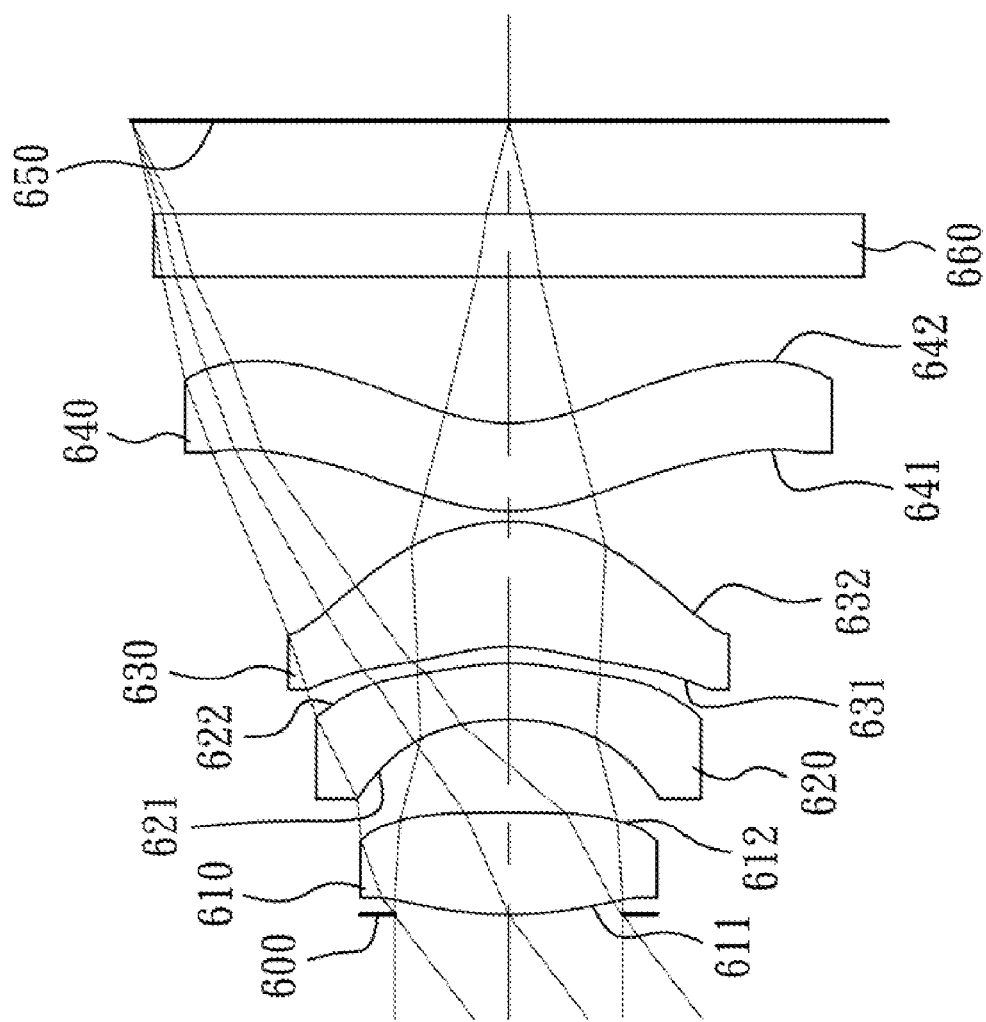
FIG. 11 is a schematic view of a photographing optical lens assembly according to the sixth embodiment of the present invention.
Figure 12:
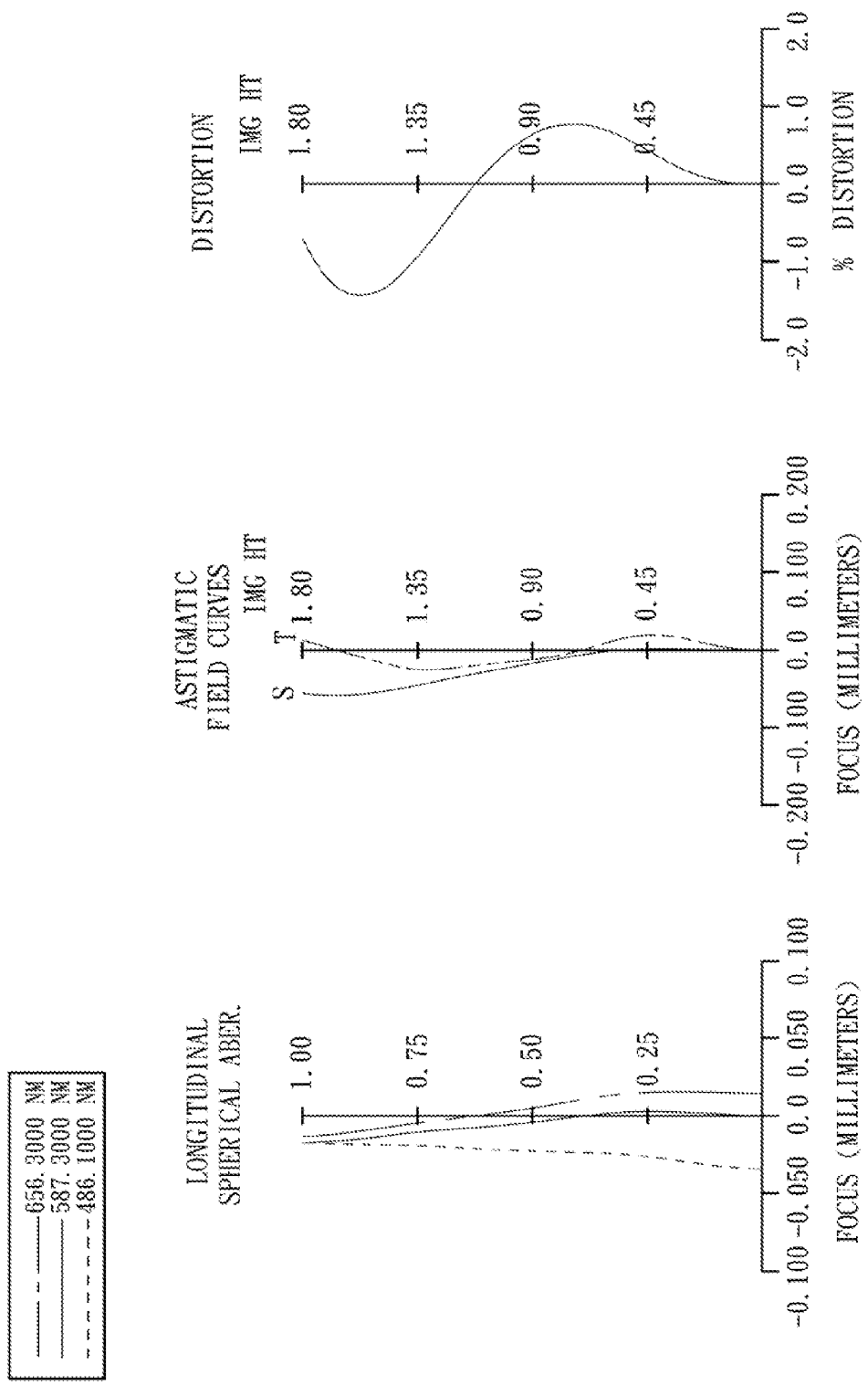
FIG. 12 shows spherical aberration curves, astigmatic field curves and distortion curve of the photographing optical lens assembly according to the sixth embodiment of the present invention.

FIG. 11 is a schematic view of a photographing optical lens assembly according to the sixth embodiment of the present invention. FIG. 12 shows spherical aberration curves, astigmatic field curves and distortion curve of the photographing optical lens assembly according to the sixth embodiment of the present invention. In FIG. 11, the photographing optical lens assembly includes, in order from an object side to an image side: an aperture stop 600, the first lens element 610, the second lens element 620, the third lens element 630, the fourth lens element 640, an IR (infrared) cut filter 660 and an image plane 650.

The first lens element 610 is made of plastic material. The first lens element 610 with positive refractive power has a convex object-side surface 611 and a convex image-side surface 612. The object-side surface 611 and the image-side surface 612 of the first lens element 610 are aspheric.

The second lens element 620 is made of plastic material. The second lens element 620 with positive refractive power has a concave object-side surface 621 and a convex image-side surface 622. The object-side surface 621 and the image-side surface 622 of the second lens element 620 are aspheric.

The third lens element 630 is made of plastic material. The third lens element 630 with positive refractive power has a concave object-side surface 631 and a convex image-side surface 632. The object-side surface 631 and the image-side surface 632 of the third lens element 630 are aspheric.

The fourth lens element 640 is made of plastic material. The fourth lens element 640 with positive refractive power has a convex object-side surface 641 and a concave image-side surface 642. The object-side surface 641 and the image-side surface 642 of the fourth lens element 640 are aspheric, and at least one inflection point is formed on the object-side surface 641 and the image-side surface 642 of the fourth lens element 640 respectively.

The IR cut filter 660 is made of glass and is located between the fourth lens element 640 and the image plane 650 with no influence on the focal length of the photographing optical lens assembly.

The equation of the aspheric surface profiles of the aforementioned lens elements of the sixth embodiment is the same as that of the first embodiment, and will not be stated herein again.

In the photographing optical lens assembly according to the sixth embodiment, the definitions of f, Fno, HFOV, f2, f3, f4, CT2, R5, R6, R7, R8, SL, TTL and Y are the same as those stated in the first embodiment with corresponding values for the sixth embodiment, and they satisfy the following relationships:

| | |
|---|---|
| f(mm) | 2.40 |
| Fno | 2.20 |
| HFOV(degrees) | 37.2 |
| \|f/f2\| + \|f/f3\| + \|f/f4\| | 0.41 |
| CT2/f | 0.11 |
| R5/R6 | 0.83 |
| R7/R8 | 1.10 |
| SL/TTL | 1.00 |
| TTL/Y | 2.05 |

The detailed optical data of the sixth embodiment is shown in Table 11, and the aspheric surface data is shown in Table 12 as follows.

TABLE 11

6th Embodiment
f = 2.40 mm, FNO = 2.20, HFOV = 37.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.000 | | | | |
| 2 | Lens 1 | 1.887480 (ASP) | 0.492 | Plastic | 1.544 | 55.9 | 2.78 |
| 3 | | −6.920100 (ASP) | 0.441 | | | | |
| 4 | Lens 2 | −1.024520 (ASP) | 0.272 | Plastic | 1.650 | 21.4 | 12.26 |
| 5 | | −1.002680 (ASP) | 0.080 | | | | |
| 6 | Lens 3 | −0.740930 (ASP) | 0.597 | Plastic | 1.530 | 55.8 | 21.93 |
| 7 | | −0.890920 (ASP) | 0.050 | | | | |
| 8 | Lens 4 | 0.919190 (ASP) | 0.417 | Plastic | 1.530 | 55.8 | 23.22 |
| 9 | | 0.837300 (ASP) | 0.700 | | | | |
| 10 | IR-filter | Plano | 0.300 | Glass | 1.517 | 64.2 | — |
| 11 | | Plano | 0.449 | | | | |
| 12 | Image | Plano | — | | | | |

The reference wavelength (d-line) is 587.6 nm

TABLE 12

Aspheric Coefficients

| Surface # | 2 | 3 | 4 | 5 |
|---|---|---|---|---|
| k = | 1.00284E+00 | 0.00000E+00 | −1.00000E+01 | −2.00000E+01 |
| A4 = | −6.82990E−02 | −1.97382E−01 | −7.97702E−01 | 3.55131E−01 |
| A6 = | −2.41468E−01 | −2.12478E−01 | −4.03319E−01 | −1.09292E+00 |
| A8 = | 3.43952E−01 | 8.19470E−02 | 7.38922E−01 | 7.01821E−01 |
| A10 = | −4.17435E−01 | −2.17479E+00 | −1.09865E−01 | −1.47252E−01 |
| A12 = | −2.10660E+00 | 4.90123E+00 | | 2.99785E−02 |
| A14 = | −2.05374E−01 | −5.15930E+00 | | |

| Surface # | 6 | 7 | 8 | 9 |
|---|---|---|---|---|
| k = | −1.12171E+01 | −5.02407E−01 | −3.96283E+00 | −1.80033E+00 |
| A4 = | 5.30579E−01 | −1.60754E−02 | −1.10470E−01 | −3.54879E−01 |
| A6 = | −9.43253E−01 | 1.67839E−01 | −3.58971E−02 | 2.35907E−01 |
| A8 = | 4.45987E−01 | −1.01533E−01 | 1.12088E−01 | −1.13045E−01 |
| A10 = | −5.45256E−02 | 1.28445E−01 | −8.58469E−02 | 3.24706E−02 |
| A12 = | 4.81656E−02 | 8.49875E−03 | 3.18825E−02 | −4.31034E−03 |
| A14 = | | −1.26399E−02 | −5.07320E−03 | |

Figure 13:
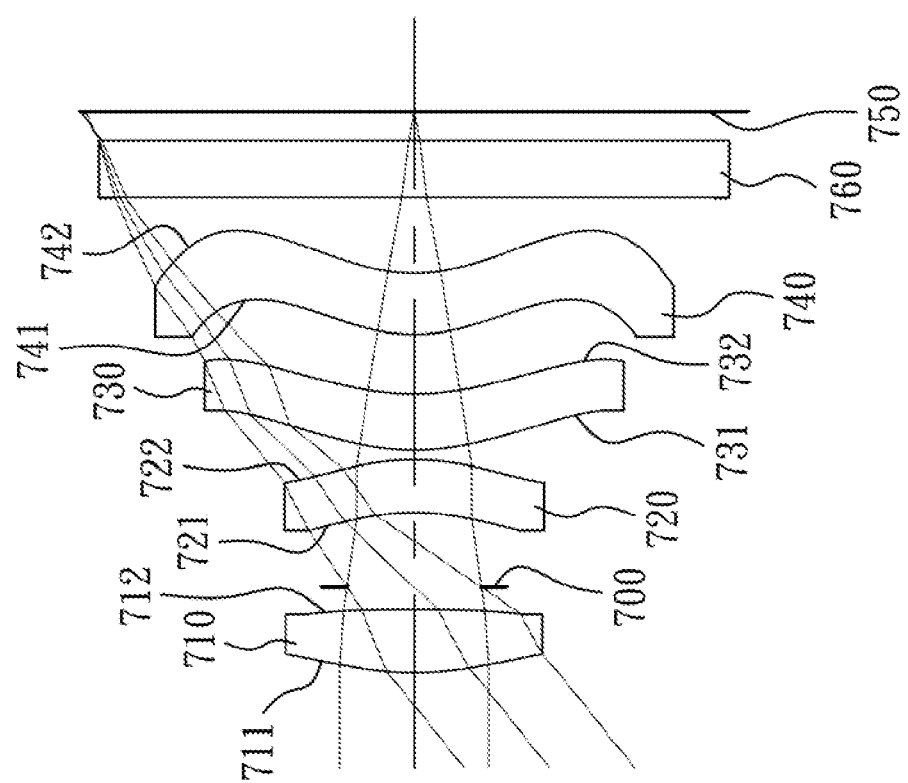
FIG. 13 is a schematic view of a photographing optical lens assembly according to the seventh embodiment of the present invention.
Figure 14:
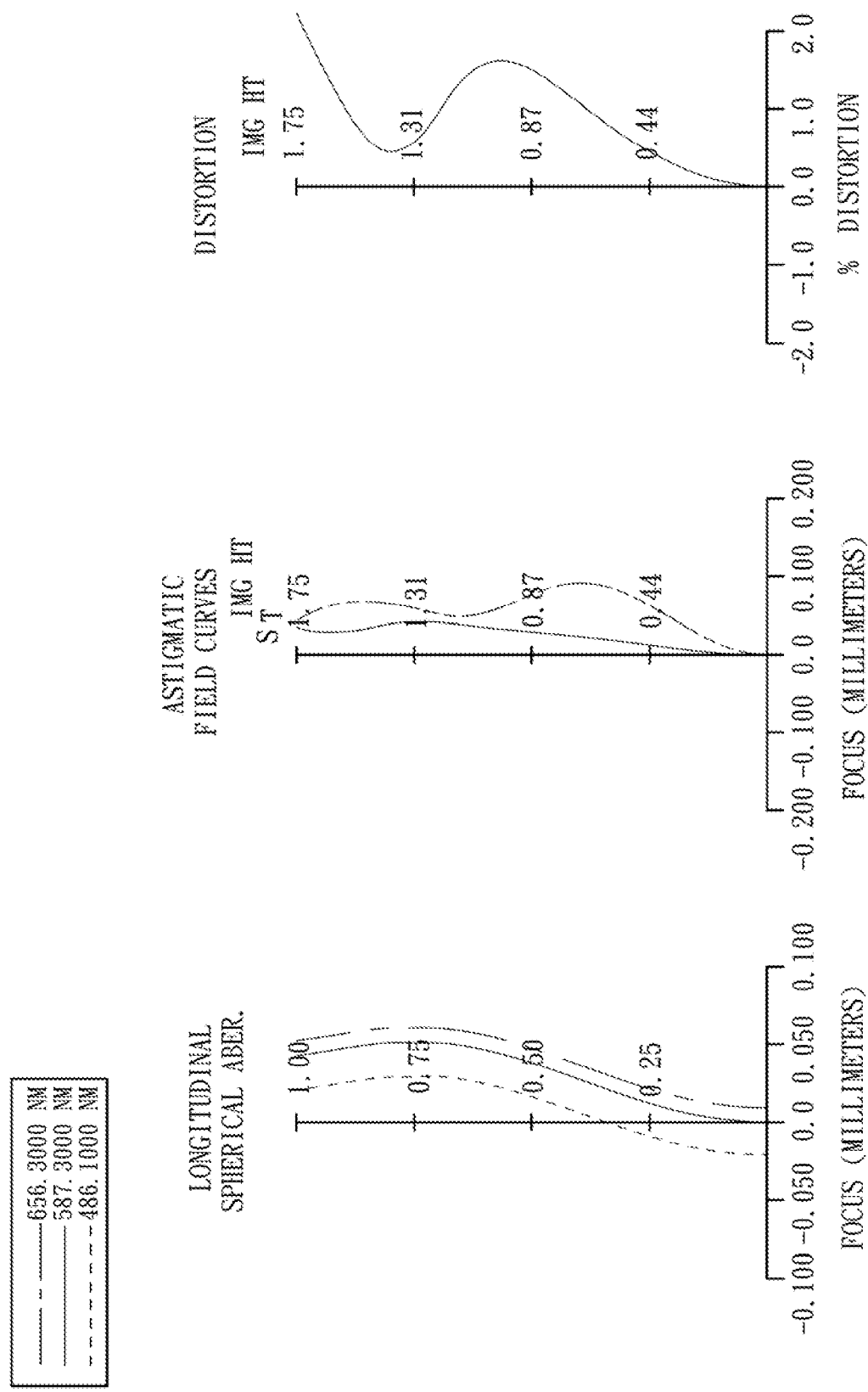
FIG. 14 shows spherical aberration curves, astigmatic field curves and distortion curve of the photographing optical lens assembly according to the seventh embodiment of the present invention.

FIG. 13 is a schematic view of a photographing optical lens assembly according to the seventh embodiment of the present invention. FIG. 14 shows spherical aberration curves, astigmatic field curves and distortion curve of the photographing optical lens assembly according to the seventh embodiment of the present invention. In FIG. 13, the photographing optical lens assembly includes, in order from an object side to an image side: the first lens element 710, an aperture stop 700, the second lens element 720, the third lens element 730, the fourth lens element 740, an IR (infrared) cut filter 760 and an image plane 750.

The first lens element 710 is made of plastic material. The first lens element 710 with positive refractive power has a convex object-side surface 711 and a convex image-side surface 712. The object-side surface 711 and the image-side surface 712 of the first lens element 710 are aspheric.

The second lens element 720 is made of plastic material. The second lens element 720 with positive refractive power has a concave object-side surface 721 and a convex image-side surface 722. The object-side surface 721 and the image-side surface 722 of the second lens element 720 are aspheric.

The third lens element 730 is made of plastic material. The third lens element 730 with positive refractive power has a convex object-side surface 731 and a concave image-side surface 732. The object-side surface 731 and the image-side surface 732 of the third lens element 730 are aspheric.

The fourth lens element 740 is made of plastic material. The fourth lens element 740 with positive refractive power has a convex object-side surface 741 and a concave image-side surface 742. The object-side surface 741 and the image-side surface 742 of the fourth lens element 740 are aspheric, and at least one inflection point is formed on the object-side surface 741 and the image-side surface 742 of the fourth lens element 740 respectively.

The IR cut filter 760 is made of glass and is located between the fourth lens element 740 and the image plane 750 with no influence on the focal length of the photographing optical lens assembly.

The equation of the aspheric surface profiles of the aforementioned lens elements of the seventh embodiment is the same as that of the first embodiment, and will not be stated herein again.

In the photographing optical lens assembly according to the seventh embodiment, the definitions of f, Fno, HFOV, f2, f3, f4, CT2, R5, R6, R7, R8, SL, TTL and Y are the same as those stated in the first embodiment with corresponding values for the seventh embodiment, and they satisfy the following relationships:

| | |
|---|---|
| f(mm) | 2.08 |
| Fno | 2.65 |
| HFOV(degrees) | 39.0 |
| \|f/f2\| + \|f/f3\| + \|f/f4\| | 0.26 |
| CT2/f | 0.13 |
| R5/R6 | 0.97 |
| R7/R8 | 1.03 |
| SL/TTL | 0.84 |
| TTL/Y | 1.64 |

The detailed optical data of the seventh embodiment is shown in Table 13, and the aspheric surface data is shown in Table 14 as follows.

TABLE 13

7th Embodiment
f = 2.08 mm, FNO = 2.65, HFOV = 39.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.670880 (ASP) | 0.337 | Plastic | 1.544 | 55.9 | 2.82 |
| 2 | | −17.663600 (ASP) | 0.116 | | | | |
| 3 | Ape. Stop | Plano | 0.393 | | | | |
| 4 | Lens 2 | −1.261650 (ASP) | 0.280 | Plastic | 1.632 | 23.4 | 57.11 |
| 5 | | −1.323810 (ASP) | 0.050 | | | | |
| 6 | Lens 3 | 1.297780 (ASP) | 0.296 | Plastic | 1.544 | 55.9 | 22.30 |
| 7 | | 1.336400 (ASP) | 0.317 | | | | |
| 8 | Lens 4 | 0.893060 (ASP) | 0.320 | Plastic | 1.544 | 55.9 | 15.72 |
| 9 | | 0.871230 (ASP) | 0.400 | | | | |
| 10 | IR-filter | Plano | 0.300 | Glass | 1.517 | 64.2 | — |
| 11 | | Plano | 0.154 | | | | |
| 12 | Image | Plano | — | | | | |

The reference wavelength (d-line) is 587.6 nm

TABLE 14

Aspheric Coefficients

| Surface # | 1 | 2 | 4 | 5 |
|---|---|---|---|---|
| k = | −1.18567E+00 | 3.00000E+00 | −1.49994E+00 | −1.23810E+01 |
| A4 = | −1.23058E−01 | −1.39850E−01 | 1.09641E−01 | −3.75391E−01 |
| A6 = | 1.01511E−01 | −1.98799E−01 | 1.30853E+00 | 8.44032E−01 |
| A8 = | −8.87227E−01 | −3.10685E−01 | −2.05293E+00 | 7.61423E−01 |
| A10 = | 4.75244E−01 | 4.14430E+00 | −4.84885E+00 | −2.12960E+00 |
| A12 = | 9.03393E−01 | −5.32294E+00 | 9.28536E+00 | 7.09776E−01 |
| A14 = | 4.67125E−01 | 2.71994E+00 | −4.50963E+00 | −3.61442E−01 |

| Surface # | 6 | 7 | 8 | 9 |
|---|---|---|---|---|
| k = | −2.20674E−01 | −9.52340E−01 | −1.22145E+00 | −1.01261E+00 |
| A4 = | −2.56182E−01 | −2.44175E−01 | −4.94208E−01 | −4.66458E−01 |
| A6 = | 1.78359E−02 | 8.07598E−02 | 2.47362E−01 | 2.02558E−01 |
| A8 = | 8.02727E−02 | −1.55546E−02 | −1.86934E−01 | −9.80447E−02 |
| A10 = | −1.07003E−01 | −1.41286E−02 | 5.38811E−02 | 1.52246E−02 |
| A12 = | 4.12465E−02 | 4.82046E−03 | −3.04009E−03 | −2.42882E−03 |
| A14 = | −1.06896E−02 | −3.23944E−03 | −2.50595E−04 | 1.54570E−03 |

Figure 15:
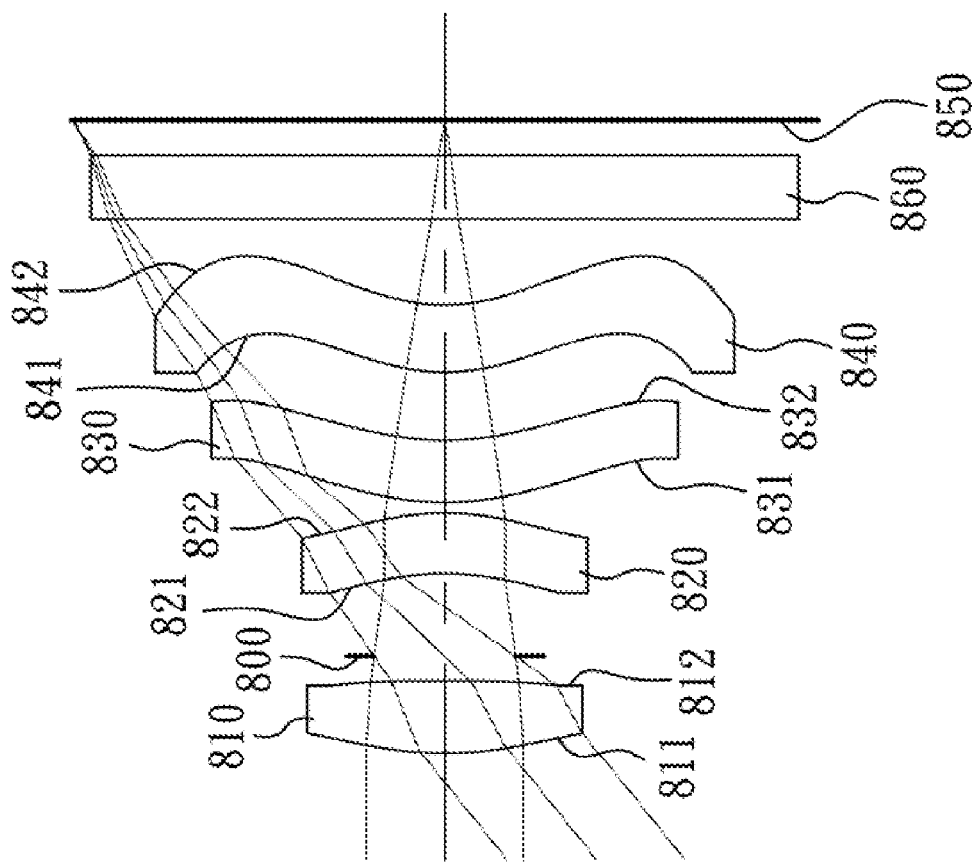
FIG. 15 is a schematic view of a photographing optical lens assembly according to the eighth embodiment of the present invention.
Figure 16:
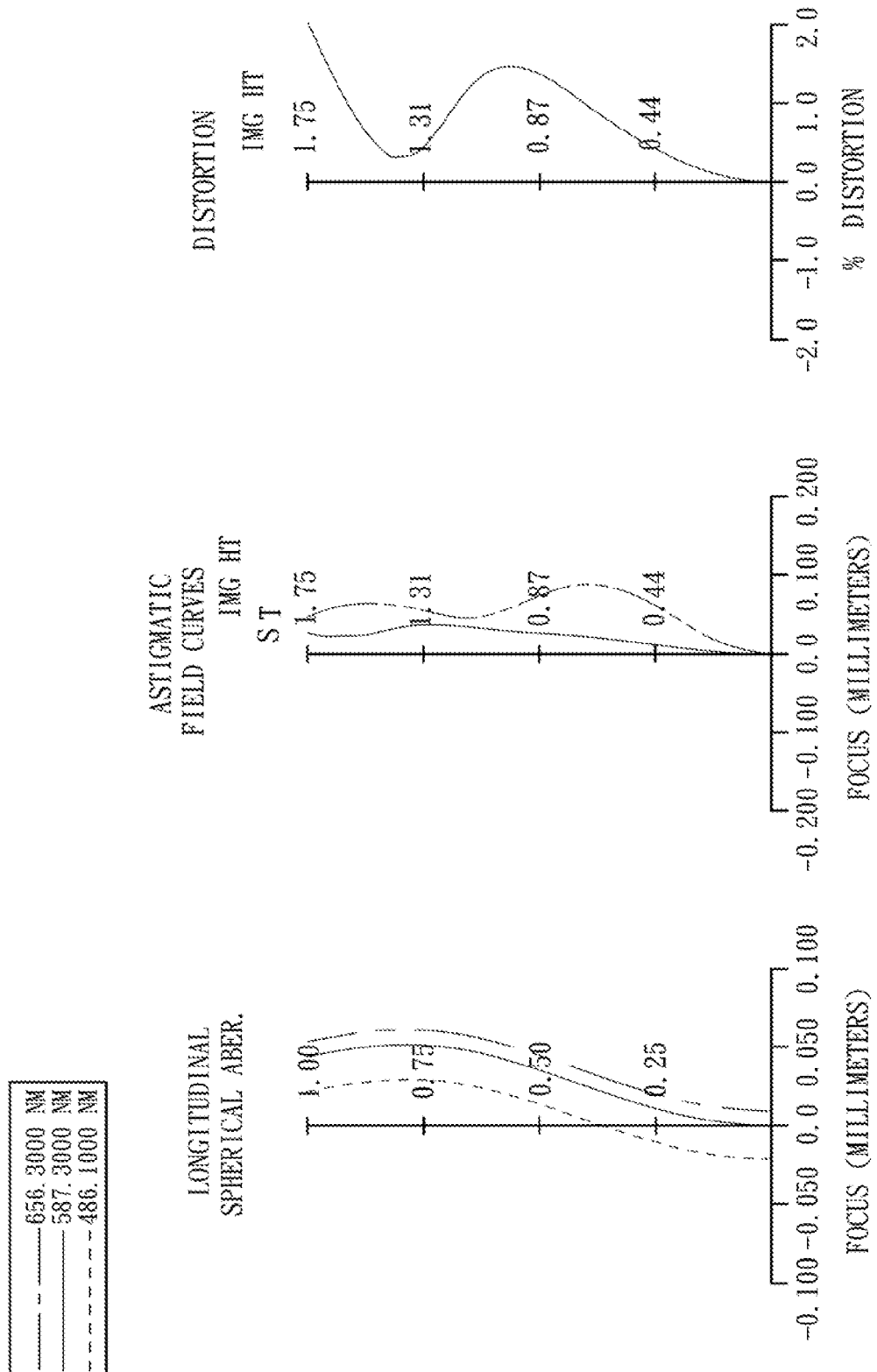
FIG. 16 shows spherical aberration curves, astigmatic field curves and distortion curve of the photographing optical lens assembly according to the eighth embodiment of the present invention.

FIG. 15 is a schematic view of a photographing optical lens assembly according to the eighth embodiment of the present invention. FIG. 16 shows spherical aberration curves, astigmatic field curves and distortion curve of the photographing optical lens assembly according to the eighth embodiment of the present invention. In FIG. 15, the photographing optical lens assembly includes, in order from an object side to an image side: the first lens element 810, an aperture stop 800, the second lens element 820, the third lens element 830, the fourth lens element 840, an IR (infrared) cut filter 860 and an image plane 850.

The first lens element 810 is made of plastic material. The first lens element 810 with positive refractive power has a convex object-side surface 811 and a convex image-side surface 812. The object-side surface 811 and the image-side surface 812 of the first lens element 810 are aspheric.

The second lens element 820 is made of plastic material. The second lens element 820 with positive refractive power has a concave object-side surface 821 and a convex image-side surface 822. The object-side surface 821 and the image-side surface 822 of the second lens element 820 are aspheric.

The third lens element 830 is made of plastic material. The third lens element 830 with positive refractive power has a convex object-side surface 831 and a concave image-side surface 832. The object-side surface 831 and the image-side surface 832 of the third lens element 830 are aspheric.

The fourth lens element 840 is made of plastic material. The fourth lens element 840 with positive refractive power has a convex object-side surface 841 and a concave image-side surface 842. The object-side surface 841 and the image-side surface 842 of the fourth lens element 840 are aspheric, and at least one inflection point is formed on the object-side surface 841 and the image-side surface 842 of the fourth lens element 840 respectively.

The IR cut filter 860 is made of glass and is located between the fourth lens element 840 and the image plane 850 with no influence on the focal length of the photographing optical lens assembly.

The equation of the aspheric surface profiles of the aforementioned lens is elements of the eighth embodiment is the same as that of the first embodiment, and will not be stated herein again.

In the photographing optical lens assembly according to the eighth embodiment, the definitions of f, Fno, HFOV, f2, f3, f4, CT2, R5, R6, R7, R8, SL, TTL and Y are the same as those stated in the first embodiment with corresponding values for the eighth embodiment, and they satisfy the following relationships:

| | |
|---|---|
| f(mm) | 2.10 |
| Fno | 2.85 |
| HFOV(degrees) | 38.9 |
| \|f/f2\| + \|f/f3\| + \|f/f4\| | 0.26 |
| CT2/f | 0.13 |
| R5/R6 | 0.97 |
| R7/R8 | 1.03 |
| SL/TTL | 0.84 |
| TTL/Y | 1.64 |

The detailed optical data of the eighth embodiment is shown in Table 15, and the aspheric surface data is shown in Table 16 as follows.

TABLE 15

8th Embodiment
f = 2.10 mm, FNO = 2.85, HFOV = 38.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.670880 (ASP) | 0.337 | Plastic | 1.544 | 55.9 | 2.82 |
| 2 | | −17.663600 (ASP) | 0.116 | | | | |
| 3 | Ape. Stop | Plano | 0.393 | | | | |
| 4 | Lens 2 | −1.261650 (ASP) | 0.280 | Plastic | 1.650 | 21.4 | 53.43 |
| 5 | | −1.323810 (ASP) | 0.050 | | | | |
| 6 | Lens 3 | 1.297780 (ASP) | 0.296 | Plastic | 1.530 | 55.8 | 23.19 |
| 7 | | 1.336400 (ASP) | 0.317 | | | | |
| 8 | Lens 4 | 0.893060 (ASP) | 0.320 | Plastic | 1.530 | 55.8 | 16.49 |
| 9 | | 0.871230 (ASP) | 0.400 | | | | |
| 10 | IR-filter | Plano | 0.300 | Glass | 1.517 | 64.2 | — |
| 11 | | Plano | 0.165 | | | | |
| 12 | Image | Plano | — | | | | |

The reference wavelength (d-line) is 587.6 nm

TABLE 16

Aspheric Coefficients

| Surface # | 1 | 2 | 4 | 5 |
|---|---|---|---|---|
| k = | −1.18567E+00 | 3.00000E+00 | −1.49994E+00 | −1.23810E+01 |
| A4 = | −1.23058E−01 | −1.39850E−01 | 1.09641E−01 | −3.75391E−01 |
| A6 = | 1.01511E−01 | −1.98799E−01 | 1.30853E+00 | 8.44032E−01 |
| A8 = | −8.87227E−01 | −3.10685E−01 | −2.05293E+00 | 7.61423E−01 |
| A10 = | 4.75244E−01 | 4.14430E+00 | −4.84885E+00 | −2.12960E+00 |
| A12 = | 9.03393E−01 | −5.32294E+00 | 9.28536E+00 | 7.09776E−01 |
| A14 = | 4.67125E−01 | 2.71994E+00 | −4.50963E+00 | −3.61442E−01 |

TABLE 16-continued

| Aspheric Coefficients | | | | |
|---|---|---|---|---|
| Surface # | 6 | 7 | 8 | 9 |
| k = | −2.20674E−01 | −9.52340E−01 | −1.22145E+00 | −1.01261E+00 |
| A4 = | −2.56182E−01 | −2.44175E−01 | −4.94208E−01 | −4.66458E−01 |
| A6 = | 1.78359E−02 | 8.07598E−02 | 2.47362E−01 | 2.02558E−01 |
| A8 = | 8.02727E−02 | −1.55546E−02 | −1.86934E−01 | −9.80447E−02 |
| A10 = | −1.07003E−01 | −1.41286E−02 | 5.38811E−02 | 1.52246E−02 |
| A12 = | 4.12465E−02 | 4.82046E−03 | −3.04009E−03 | −2.42882E−03 |
| A14 = | −1.06896E−02 | −3.23944E−03 | −2.50595E−04 | 1.54570E−03 |

Figure 17:
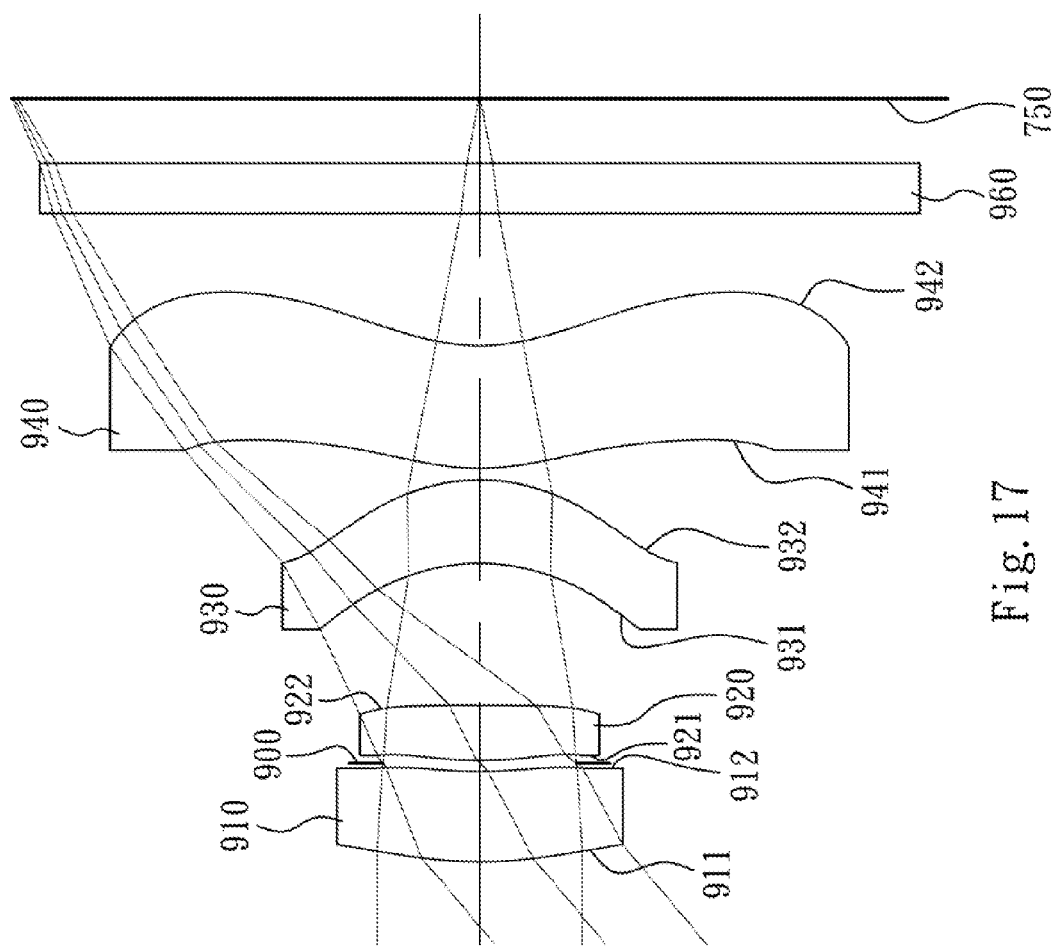
FIG. 17 is a schematic view of a photographing optical lens assembly according to the ninth embodiment of the present invention.
Figure 18:
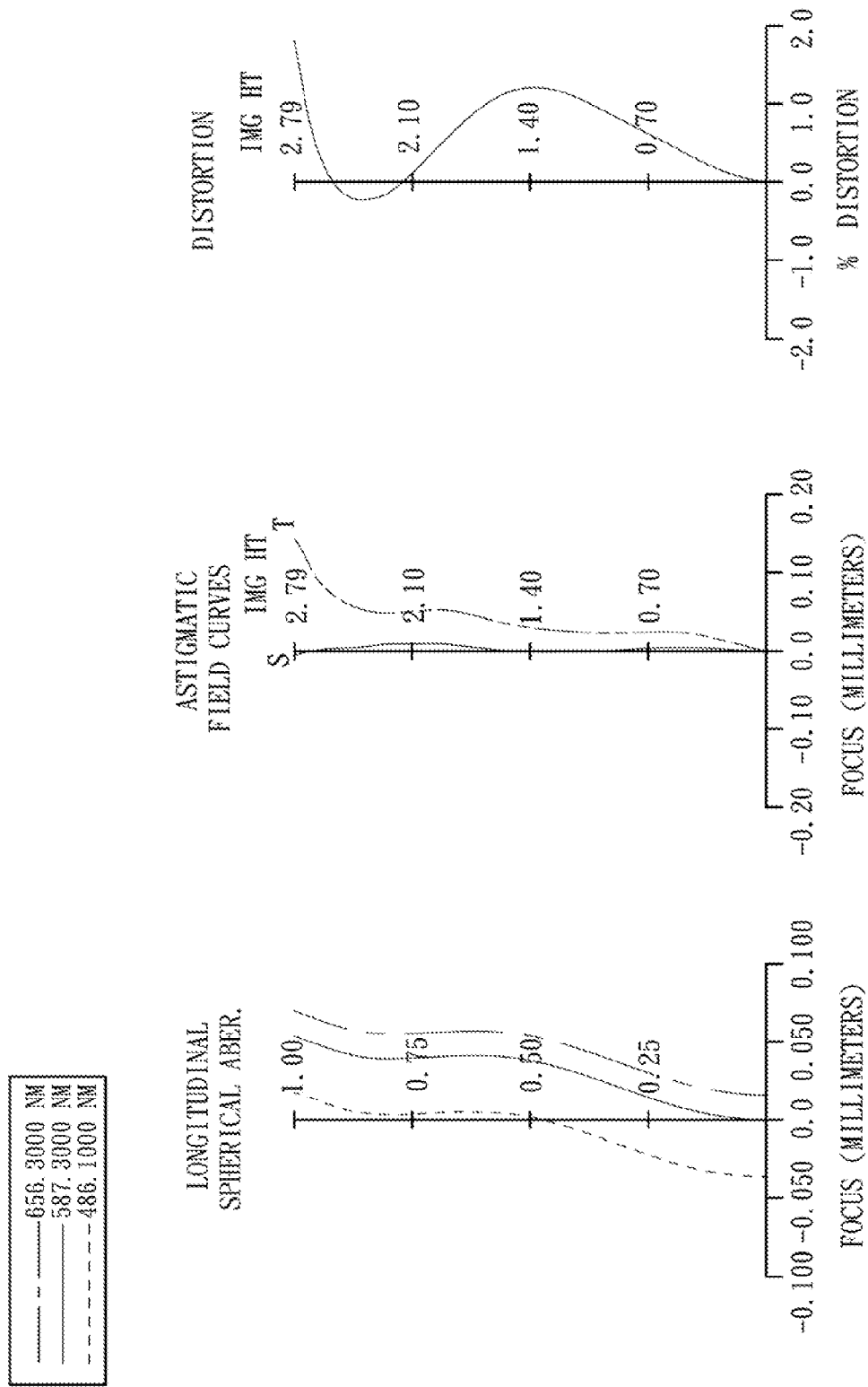
FIG. 18 shows spherical aberration curves, astigmatic field curves and distortion curve of the photographing optical lens assembly according to the ninth embodiment of the present invention.

FIG. 17 is a schematic view of a photographing optical lens assembly according to the ninth embodiment of the present invention. FIG. 18 shows spherical aberration curves, astigmatic field curves and distortion curve of the photographing optical lens assembly according to the ninth embodiment of the present invention. In FIG. 17, the photographing optical lens assembly includes, in order from an object side to an image side: the first lens element 910, an aperture stop 900, the second lens element 920, the third lens element 930, the fourth lens element 940, an IR (infrared) cut filter 960 and an image plane 950.

The first lens element 910 is made of glass. The first lens element 910 with positive refractive power has a convex object-side surface 911 and a concave image-side surface 912. The object-side surface 911 and the image-side surface 912 of the first lens element 910 are aspheric.

The second lens element 920 is made of plastic material. The second lens element 920 with positive refractive power has a convex object-side surface 921 and a convex image-side surface 922. The object-side surface 921 and the image-side surface 922 of the second lens element 920 are aspheric.

The third lens element 930 is made of plastic material. The third lens element 930 with positive refractive power has a concave object-side surface 931 and a convex image-side surface 932. The object-side surface 931 and the image-side surface 932 of the third lens element 930 are aspheric.

The fourth lens element 940 is made of plastic material. The fourth lens element 940 with positive refractive power has a convex object-side surface 941 and a concave image-side surface 942. The object-side surface 941 and the image-side surface 942 of the fourth lens element 940 are aspheric, and at least one inflection point is formed on the object-side surface 941 and the image-side surface 942 of the fourth lens element 940 respectively.

The IR cut filter 960 is made of glass and is located between the fourth lens element 940 and the image plane 950 with no influence on the focal length of the photographing optical lens assembly.

The equation of the aspheric surface profiles of the aforementioned lens elements of the ninth embodiment is the same as that of the first embodiment, and will not be stated herein again.

In the photographing optical lens assembly according to the ninth embodiment, the definitions of f, Fno, HFOV, f2, f3, f4, CT2, R5, R6, R7, R8, SL, TTL and Y are the same as those stated in the first embodiment with corresponding values for the ninth embodiment, and they satisfy the following relationships:

| | |
|---|---|
| f(mm) | 3.27 |
| Fno | 2.65 |
| HFOV(degrees) | 39.9 |
| \|f/f2\| + \|f/f3\| + \|f/f4\| | 1.01 |
| CT2/f | 0.10 |
| R5/R6 | 0.92 |
| R7/R8 | 1.18 |
| SL/TTL | 0.87 |
| TTL/Y | 1.60 |

The detailed optical data of the ninth embodiment is shown in Table 17, and the aspheric surface data is shown in Table 18 as follows.

TABLE 17

9th Embodiment
f = 3.27 mm, FNO = 2.65, HFOV = 39.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.684030 (ASP) | 0.540 | Glass | 1.517 | 64.2 | 72.08 |
| 2 | | 2.694180 (ASP) | 0.050 | | | | |
| 3 | Ape. Stop | Plano | 0.019 | | | | |
| 4 | Lens 2 | 2.125840 (ASP) | 0.328 | Plastic | 1.544 | 55.9 | 3.82 |
| 5 | | −88.183400 (ASP) | 0.855 | | | | |
| 6 | Lens 3 | −1.175120 (ASP) | 0.502 | Plastic | 1.544 | 55.9 | 34.95 |
| 7 | | −1.273350 (ASP) | 0.070 | | | | |
| 8 | Lens 4 | 1.362510 (ASP) | 0.738 | Plastic | 1.544 | 55.9 | 57.00 |
| 9 | | 1.153100 (ASP) | 0.800 | | | | |
| 10 | IR-filter | Plano | 0.300 | Glass | 1.517 | 64.2 | — |
| 11 | | Plano | 0.392 | | | | |
| 12 | Image | Plano | — | | | | |

The reference wavelength (d-line) is 587.6 nm

TABLE 18

| Aspheric Coefficients | | | | |
|---|---|---|---|---|
| Surface # | 1 | 2 | 4 | 5 |
| k = | −2.63572E+00 | 9.74878E+00 | 6.22917E+00 | 1.43550E+02 |
| A4 = | −4.54978E−02 | −4.49878E−01 | −4.53377E−01 | −5.02167E−02 |
| A6 = | 7.29848E−04 | 4.44918E−02 | −1.26575E−01 | −4.22006E−01 |
| A8 = | 6.97854E−02 | 6.25509E−02 | −3.51265E−02 | 6.37723E−01 |
| A10 = | −2.65330E−01 | −5.98549E−01 | −9.96662E−01 | −9.22868E−01 |
| A12 = | 2.95154E−01 | 3.56135E−01 | 6.19720E−01 | 3.62632E−01 |
| A14 = | −5.40629E−02 | −3.42016E−01 | −5.16978E−01 | 2.88549E−01 |
| A16 = | −9.33266E−02 | 1.96849E−01 | 5.99524E−01 | −2.09722E−01 |

| Surface # | 6 | 7 | 8 | 9 |
|---|---|---|---|---|
| k = | −1.09666E+01 | −5.61783E−01 | −9.80072E+00 | −4.07839E+00 |
| A4 = | −4.66462E−01 | −1.53705E−01 | −9.34764E−02 | −7.97440E−02 |
| A6 = | 5.36627E−01 | 2.13619E−01 | 3.59581E−02 | 2.52870E−02 |
| A8 = | −5.68200E−01 | −1.55871E−01 | −6.14196E−03 | −6.52770E−03 |
| A10 = | 3.99163E−01 | 1.19689E−01 | 4.50773E−04 | 9.36668E−04 |
| A12 = | −8.48816E−02 | 9.26172E−03 | −6.54021E−05 | −2.56824E−05 |
| A14 = | 1.17812E−02 | −4.15562E−02 | −1.61903E−05 | −1.22174E−05 |
| A16 = | −3.45245E−02 | 1.05233E−02 | 2.85119E−06 | 9.24761E−07 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing optical lens assembly comprising, in order from an object side to an image side:
    a first lens element with positive refractive power having a convex object-side surface;
    a second lens element with positive refractive power;
    a third lens element with positive refractive power; and
    a fourth lens element with positive refractive power;
    wherein an axial distance from the object-side surface of the first lens element to an image plane is TTL, a maximum image height of the photographing optical lens assembly is Y, and they satisfy the following relationship:

$TTL/Y<2.1$.

2. The photographing optical lens assembly of claim 1, wherein the fourth lens element has a convex object-side surface and a concave image-side surface.

3. The photographing optical lens assembly of claim 2, wherein a focal length of the photographing optical lens assembly is f, a focal length of the second lens element is f2, a focal length of the third lens element is f3, a focal length of the fourth lens element is f4, and they satisfy the following relationship:

$|f/f2|+|f/f3|+|f/f4|<1.15$.

4. The photographing optical lens assembly of claim 3, further comprising:
    a stop, wherein an axial distance between the stop and the image plane is SL, an axial distance from the object-side surface of the first lens element to the image plane is TTL, and they satisfy the following relationship:

$0.7<SL/TTL<1.2$.

5. The photographing optical lens assembly of claim 3, wherein the fourth lens element is made of plastic material, the object-side surface and the image-side surface of the fourth lens element are aspheric, and the fourth lens element has at least one inflection point formed on at least one of the object-side surface and the image-side surface thereof.

6. The photographing optical lens assembly of claim 3, wherein the focal length of the photographing optical lens assembly is f, the focal length of the second lens element is f2, the focal length of the third lens element is f3, the focal length of the fourth lens element is f4, and they satisfy the following relationship:

$|f/f2|+|f/f3|+|f/f4|<0.8$.

7. The photographing optical lens assembly of claim 2, wherein a central thickness of the second lens element is CT2, the focal length of the photographing optical lens assembly is f, and they satisfy the following relationship:

$0.02<CT2/f<0.15$.

8. The photographing optical lens assembly of claim 2, wherein a curvature radius of the object-side surface of the third lens element is R5, a curvature radius of the image-side surface of the third lens element is R6, a curvature radius of the object-side surface of the fourth lens element is R7, a curvature radius of the image-side surface of the fourth lens element is R8, and they satisfy the following relationships:

$0.7<R5/R6<1.2$; and $0.8<R7/R8<1.3$.

9. A photographing optical lens assembly comprising, in order from an object side to an image side:
    a first lens element with positive refractive power having a convex object-side surface;
    a second lens element with positive refractive power;
    a third lens element with positive refractive power; and
    a fourth lens element with positive refractive power having a convex object-side surface and a concave image-side surface, and made of plastic material, wherein the object-side surface and the image-side surface of the fourth lens element are aspheric, and the fourth lens element has at least one inflection point formed on at least one of the object-side surface and the image-side surface thereof;
    wherein a focal length of the photographing optical lens assembly is f, a focal length of the second lens element is f2, a focal length of the third lens element is f3, a focal length of the fourth lens element is f4, and they satisfy the following relationship:

$$|f/f2|+|f/f3|+|f/f4|<1.15.$$

10. The photographing optical lens assembly of claim 9, further comprising:
    a stop, wherein an axial distance between the stop and an image plane is SL, an axial distance from the object-side surface of the first lens element to the image plane is TTL, and they satisfy the following relationship:

$$0.7<SL/TTL<1.2.$$

11. The photographing optical lens assembly of claim 9, wherein a central thickness of the second lens element is CT2, the focal length of the photographing optical lens assembly is f, and they satisfy the following relationship:

$$0.02<CT2/f<0.15.$$

12. The photographing optical lens assembly of claim 9, wherein a curvature radius of the object-side surface of the third lens element is R5, a curvature radius of the image-side surface of the third lens element is R6, a curvature radius of the object-side surface of the fourth lens element is R7, a curvature radius of the image-side surface of the fourth lens element is R8, and they satisfy the following relationships:

$$0.7<R5/R6<1.2; \text{ and}$$

$$0.8<R7/R8<1.3.$$

13. The photographing optical lens assembly of claim 9, wherein the third lens element has a concave object-side surface and a convex image-side surface.

14. The photographing optical lens assembly of claim 9, wherein the third lens element has a convex object-side surface and a concave image-side surface.

15. A photographing optical lens assembly comprising, in order from an object side to an image side:
    a first lens element with positive refractive power having a convex object-side surface;
    a second lens element with positive refractive power being a meniscus;
    a third lens element with positive refractive power being a meniscus;
    a fourth lens element with positive refractive power having a convex object-side surface and a concave image-side surface, and made of plastic material, wherein the object-side surface and the image-side surface of the fourth lens element are aspheric, and the fourth lens element has at least one inflection point formed on at least one of the object-side surface and the image-side surface thereof.

16. The photographing optical lens assembly of claim 15, wherein a focal length of the photographing optical lens assembly is f, a focal length of the second lens element is f2, a focal length of the third lens element is f3, a focal length of the fourth lens element is f4, and they satisfy the following relationship:

$$|f/f2|+|f/f3|+|f/f4|<0.8.$$

17. The photographing optical lens assembly of claim 15, further comprising:
    a stop, wherein an axial distance between the stop and an image plane is SL, an axial distance from the object-side surface of the first lens element to the image plane is TTL, and they satisfy the following relationship:

$$0.7<SL/TTL<1.2.$$

18. The photographing optical lens assembly of claim 15, wherein a central thickness of the second lens element is CT2, the focal length of the photographing optical lens assembly is f, and they satisfy the following relationship:

$$0.02<CT2/f<0.15.$$

19. The photographing optical lens assembly of claim 15, wherein the axial distance from the object-side surface of the first lens element to an image plane is TTL, a maximum image height of the photographing optical lens assembly is Y, and they satisfy the following relationship:

$$TTL/Y<2.1.$$

20. The photographing optical lens assembly of claim 15, wherein a curvature radius of the object-side surface of the third lens element is R5, a curvature radius of the image-side surface of the third lens element is R6, a curvature radius of the object-side surface of the fourth lens element is R7, a curvature radius of the image-side surface of the fourth lens element is R8, and they satisfy the following relationships:

$$0.7<R5/R6<1.2; \text{ and}$$

$$0.8<R7/R8<1.3.$$

* * * * *